(12) United States Patent
Arizpe et al.

(10) Patent No.: US 9,568,138 B2
(45) Date of Patent: Feb. 14, 2017

(54) MANIFOLD ASSEMBLY

(71) Applicant: S.P.M. Flow Control, Inc., Fort Worth, TX (US)

(72) Inventors: Ron Arizpe, Fort Worth, TX (US); Lun Tsuei, Dallas, TX (US); Timothy Long, Oklahoma City, OK (US); Adam Hardman, Fort Worth, TX (US); Matthew Green, Norman, OK (US)

(73) Assignee: S.P.M. FLOW CONTROL, INC., Fort Worth, TX (US)

( * ) Notice: Subject to any disclaimer, the term of this patent is extended or adjusted under 35 U.S.C. 154(b) by 218 days.

(21) Appl. No.: 14/319,010

(22) Filed: Jun. 30, 2014

(65) Prior Publication Data

US 2015/0000766 A1 Jan. 1, 2015

Related U.S. Application Data

(60) Provisional application No. 61/841,753, filed on Jul. 1, 2013.

(51) Int. Cl.
*F16L 55/035* (2006.01)
*F16L 41/03* (2006.01)
(Continued)

(52) U.S. Cl.
CPC .............. *F16L 55/035* (2013.01); *E21B 43/26* (2013.01); *F16L 41/03* (2013.01); *F16F 7/14* (2013.01);
(Continued)

(58) Field of Classification Search
CPC ....................................................... E21B 43/26
(Continued)

(56) References Cited

U.S. PATENT DOCUMENTS

| 345,420 A | 7/1886 | Eskholme et al. |
| 375,464 A | 12/1887 | Thacher et al. |
| (Continued) | | |

FOREIGN PATENT DOCUMENTS

| AU | 1320088 A | 9/1988 |
| AU | 649744 B2 | 6/1994 |
| (Continued) | | |

OTHER PUBLICATIONS

"Canadian Notice of Allowance mailed Jun. 22, 2015, by the CIPO, re App No. 2636751".

(Continued)

*Primary Examiner* — Craig Schneider
*Assistant Examiner* — Daniel P Donegan
(74) *Attorney, Agent, or Firm* — Haynes and Boone, LLP

(57) ABSTRACT

According to one aspect, a manifold assembly includes a skid, a low pressure manifold connected to the skid, and a high pressure manifold connected to the skid. In another aspect, the high pressure manifold has a modular configuration so that the high pressure manifold is disconnectable in whole or in part from the skid, and reconnectable in whole or in part to the skid. In yet another aspect, the high pressure manifold includes high pressure modules, all of which are in fluid communication with each other and each of which is adapted to be in fluid communication with at least one pump. In still yet another aspect, the low pressure manifold includes one or more flow lines, the high pressure manifold includes fittings, and the manifold assembly includes vibration isolators to dampen dynamic loading, the vibration isolators being disposed between the fittings and the one or more flow lines.

15 Claims, 12 Drawing Sheets

(51) Int. Cl.
*E21B 43/26* (2006.01)
*F16F 7/14* (2006.01)
(52) U.S. Cl.
CPC ... *Y10T 137/6966* (2015.04); *Y10T 137/85938* (2015.04)
(58) Field of Classification Search
USPC .................................. 137/343, 884; 166/105
See application file for complete search history.

(56) References Cited

U.S. PATENT DOCUMENTS

| | | | |
|---|---|---|---|
| 580,226 A | 4/1897 | Sanford |
| 741,477 A | 10/1903 | Flinn |
| 1,201,022 A | 10/1916 | Conniff |
| 1,379,092 A | 5/1921 | Fraccascia et al. |
| 1,452,603 A | 4/1923 | Himes |
| 1,473,634 A | 11/1923 | Loudon |
| 1,483,001 A | 2/1924 | Kurre |
| 1,488,211 A | 3/1924 | Loeffler |
| 1,543,637 A | 6/1925 | Woll |
| 1,607,463 A | 11/1926 | Kent |
| 1,664,493 A | 4/1928 | Smith |
| 1,675,808 A | 7/1928 | Kliss |
| 1,764,936 A | 6/1930 | Dean |
| 1,798,498 A | 3/1931 | Riley |
| D86,952 S | 5/1932 | Garrison |
| 1,889,256 A | 11/1932 | Lipscomb et al. |
| 1,990,090 A | 2/1935 | Packard |
| 2,197,320 A | 4/1940 | Shenton |
| 2,310,583 A | 2/1943 | Johnson |
| 2,310,813 A | 2/1943 | Sellmeyer |
| 2,339,287 A | 1/1944 | Neef, Jr. |
| 2,354,161 A | 7/1944 | Waterman |
| 2,361,881 A | 10/1944 | Sheppard |
| 2,391,266 A | 12/1945 | Parker |
| 2,404,142 A | 7/1946 | Parker |
| D150,466 S | 8/1948 | Schuler |
| 2,506,162 A | 5/1950 | Metzgar |
| 2,576,431 A | 11/1951 | White |
| 2,587,212 A | 2/1952 | Placette |
| 2,589,144 A | 3/1952 | Russell et al. |
| 2,606,068 A | 8/1952 | Bonacor |
| 2,612,340 A | 9/1952 | Laurent |
| 2,663,458 A | 12/1953 | MacGlashan, Jr. |
| 2,694,503 A | 11/1954 | Young et al. |
| 2,717,001 A | 9/1955 | Perrault |
| 2,746,773 A | 5/1956 | Bily |
| 2,766,999 A | 10/1956 | Watts et al. |
| 2,795,459 A | 6/1957 | Cornelius |
| 2,923,317 A | 2/1960 | McInerney |
| 2,925,827 A | 2/1960 | Anderson et al. |
| 2,969,492 A | 1/1961 | Wheatley |
| 3,024,047 A | 3/1962 | Schmohl |
| 3,060,961 A | 10/1962 | Conley |
| 3,061,267 A | 10/1962 | Hamer |
| 3,064,940 A | 11/1962 | Anderson et al. |
| 3,072,379 A | 1/1963 | Hamer |
| 3,108,939 A | 10/1963 | Sabins |
| 3,113,792 A | 12/1963 | Brown |
| 3,150,681 A | 9/1964 | Hansen et al. |
| 3,160,426 A | 12/1964 | Faeser |
| 3,194,589 A | 7/1965 | Kahlbau et al. |
| 3,204,484 A | 9/1965 | Gustafson et al. |
| 3,216,746 A | 11/1965 | Watts |
| 3,228,334 A | 1/1966 | Oss |
| 3,238,687 A | 3/1966 | Tisbo |
| 3,241,567 A | 3/1966 | Pusch et al. |
| 3,294,425 A | 12/1966 | Franck |
| 3,341,232 A | 9/1967 | Deakins |
| 3,343,802 A | 9/1967 | Schuilwerve |
| 3,346,002 A | 10/1967 | Thompson, Jr. et al. |
| 3,357,679 A | 12/1967 | Gulick |
| 3,403,931 A | 10/1968 | Crain et al. |
| 3,404,698 A | 10/1968 | Rouse |
| 3,425,661 A | 2/1969 | Mayo |
| 3,439,897 A | 4/1969 | Priese et al. |
| 3,455,534 A | 7/1969 | Scaramucci |
| 3,467,224 A | 9/1969 | Curtis et al. |
| 3,472,479 A | 10/1969 | Sherwood |
| 3,554,581 A | 1/1971 | Mason et al. |
| 3,556,474 A | 1/1971 | Scaramucci |
| 3,561,727 A | 2/1971 | Scaramucci |
| 3,571,896 A | 3/1971 | Wilkerson |
| 3,594,835 A | 7/1971 | Wilson |
| 3,630,483 A | 12/1971 | Canalizo |
| 3,680,188 A | 8/1972 | Mason et al. |
| 3,687,415 A | 8/1972 | Turkot |
| 3,712,585 A | 1/1973 | Grenier |
| 3,726,314 A | 4/1973 | Moen |
| 3,789,872 A | 2/1974 | Elliott |
| 3,813,733 A | 6/1974 | Flohr |
| 3,830,306 A | 8/1974 | Brown |
| 3,840,048 A | 10/1974 | Moen |
| 3,845,876 A | 11/1974 | Needham et al. |
| 3,845,879 A | 11/1974 | Dernbach et al. |
| 3,881,480 A | 5/1975 | Lafourcade |
| 3,894,718 A | 7/1975 | Koch et al. |
| 3,901,259 A | 8/1975 | Banbury |
| 3,916,950 A | 11/1975 | Mongerson et al. |
| 3,933,172 A | 1/1976 | Allen |
| 3,934,608 A | 1/1976 | Guyton |
| 3,937,240 A | 2/1976 | Nanny |
| 3,942,551 A | 3/1976 | Schuller et al. |
| 3,967,842 A | 7/1976 | Kendrick |
| 3,972,364 A | 8/1976 | Brumm |
| 3,974,848 A | 8/1976 | Wheatley |
| 4,022,427 A | 5/1977 | Read |
| 4,027,696 A | 6/1977 | Guyton |
| 4,046,164 A | 9/1977 | Pool |
| 4,059,872 A | 11/1977 | Delesandri |
| 4,085,770 A | 4/1978 | Woronowicz |
| 4,086,803 A | 5/1978 | Wheeler |
| 4,093,180 A | 6/1978 | Strabala |
| 4,109,714 A | 8/1978 | Greenlee et al. |
| 4,113,228 A | 9/1978 | Frye |
| 4,146,047 A | 3/1979 | Wood et al. |
| 4,150,847 A | 4/1979 | De Cenzo |
| 4,158,510 A * | 6/1979 | Smith ..................... B28C 5/02 366/16 |
| 4,171,095 A | 10/1979 | Filan et al. |
| 4,218,080 A | 8/1980 | Kendrick |
| 4,221,204 A | 9/1980 | Meyer |
| 4,254,793 A | 3/1981 | Scaramucci |
| 4,261,387 A | 4/1981 | Cohn |
| 4,274,434 A | 6/1981 | Haefele |
| 4,286,621 A | 9/1981 | Glahn |
| 4,308,916 A | 1/1982 | Fritz, Jr. |
| 4,321,945 A | 3/1982 | Chabat-Courrede |
| 4,327,768 A | 5/1982 | Behle |
| 4,332,370 A | 6/1982 | Williams |
| 4,338,707 A | 7/1982 | Byerly |
| 4,367,571 A | 1/1983 | Speirs et al. |
| 4,378,849 A | 4/1983 | Wilks |
| 4,399,830 A | 8/1983 | Brodie |
| 4,445,255 A | 5/1984 | Olejak |
| 4,448,148 A | 5/1984 | Gain, Jr. |
| 4,478,388 A | 10/1984 | George |
| 4,485,530 A | 12/1984 | Begley et al. |
| 4,485,843 A | 12/1984 | Wolff |
| 4,497,344 A | 2/1985 | Kisiel |
| 4,501,291 A | 2/1985 | Siegrist |
| 4,506,696 A | 3/1985 | Von Pechmann |
| 4,511,120 A | 4/1985 | Conley et al. |
| 4,524,599 A | 6/1985 | Bailey |
| 4,531,542 A | 7/1985 | Looney |
| 4,572,237 A | 2/1986 | Thompson |
| 4,590,957 A | 5/1986 | McFarlane |
| 4,597,505 A | 7/1986 | Mozley et al. |
| 4,605,036 A | 8/1986 | Smith et al. |
| 4,616,803 A | 10/1986 | Schils |
| 4,662,603 A | 5/1987 | Etheridge |
| 4,667,570 A | 5/1987 | Jensen, Jr. et al. |
| 4,705,306 A | 11/1987 | Guido et al. |

(56) References Cited

U.S. PATENT DOCUMENTS

| | | |
|---|---|---|
| 4,716,930 A | 1/1988 | Richmond et al. |
| 4,732,215 A | 3/1988 | Hopper |
| 4,836,240 A | 6/1989 | Elliott |
| 4,842,014 A | 6/1989 | Strelow et al. |
| 4,848,398 A | 7/1989 | Leach |
| 4,850,392 A | 7/1989 | Crump et al. |
| 4,864,696 A | 9/1989 | Mittermaier et al. |
| 4,896,367 A | 1/1990 | Newton et al. |
| 4,915,418 A | 4/1990 | Palatchy |
| 4,969,482 A | 11/1990 | Perrin et al. |
| 4,993,489 A | 2/1991 | McLeod |
| 5,025,865 A | 6/1991 | Caldwell et al. |
| 5,046,525 A | 9/1991 | Powell |
| 5,056,548 A | 10/1991 | Mills |
| 5,143,112 A | 9/1992 | Scaramucci |
| 5,161,566 A | 11/1992 | Scaramucci |
| 5,161,570 A | 11/1992 | Scaramucci |
| 5,165,478 A | 11/1992 | Wilson |
| 5,178,185 A | 1/1993 | Stehling et al. |
| 5,199,464 A | 4/1993 | Savard |
| 5,307,835 A | 5/1994 | Scaramucci |
| 5,341,840 A | 8/1994 | Manson et al. |
| 5,386,847 A | 2/1995 | Scaramucci |
| 5,417,402 A | 5/1995 | Speybroeck |
| D360,728 S | 7/1995 | Nozaki |
| 5,439,027 A | 8/1995 | Layton et al. |
| 5,441,072 A | 8/1995 | Indey et al. |
| 5,443,088 A | 8/1995 | Hoch et al. |
| 5,462,413 A | 10/1995 | Schroeder |
| 5,477,752 A | 12/1995 | West et al. |
| 5,507,533 A | 4/1996 | Mumma |
| 5,522,420 A | 6/1996 | Martin |
| 5,526,883 A | 6/1996 | Breaux |
| 5,538,296 A | 7/1996 | Horton |
| 5,544,675 A | 8/1996 | Dean |
| 5,584,315 A | 12/1996 | Powell |
| 5,603,485 A | 2/1997 | Schwarz |
| 5,676,348 A | 10/1997 | Ungchusri et al. |
| 5,685,334 A | 11/1997 | Hagan |
| 5,689,862 A | 11/1997 | Hayes et al. |
| 5,755,427 A | 5/1998 | Koskinas |
| 5,787,926 A | 8/1998 | Mukumoto et al. |
| 5,791,693 A | 8/1998 | Crawford |
| 5,832,947 A | 11/1998 | Niemczyk |
| 5,947,152 A | 9/1999 | Martin et al. |
| 5,957,592 A | 9/1999 | Yamanaka |
| 5,971,007 A | 10/1999 | Harcourt et al. |
| 5,983,826 A | 11/1999 | Lohde |
| 6,003,837 A | 12/1999 | Raymond, Jr. et al. |
| 6,029,693 A | 2/2000 | Nakanishi et al. |
| 6,079,439 A | 6/2000 | Hartley |
| 6,082,707 A | 7/2000 | Hosie et al. |
| 6,085,572 A | 7/2000 | McGuire, Sr. et al. |
| 6,089,531 A | 7/2000 | Young |
| 6,155,091 A | 12/2000 | Hayes et al. |
| 6,164,707 A | 12/2000 | Ungchusri et al. |
| 6,209,561 B1 | 4/2001 | Kugelev et al. |
| 6,230,733 B1 | 5/2001 | Strelow et al. |
| 6,240,951 B1 | 6/2001 | Yori |
| 6,250,605 B1 | 6/2001 | Young |
| 6,290,237 B1 | 9/2001 | Graupner |
| 6,361,051 B1 | 3/2002 | Babin |
| 6,371,527 B1 | 4/2002 | Ungchusri et al. |
| 6,382,247 B1 | 5/2002 | Gundry |
| 6,387,226 B1 | 5/2002 | Persson |
| 6,450,477 B1 | 9/2002 | Young |
| 6,554,024 B2 | 4/2003 | Mefford et al. |
| 6,554,249 B2 | 4/2003 | Pang et al. |
| 6,742,538 B1 | 6/2004 | Aderholt et al. |
| 6,752,377 B1 | 6/2004 | Taylor |
| 6,770,177 B2 | 8/2004 | Keller et al. |
| 6,843,265 B2 | 1/2005 | Taylor |
| 6,854,704 B1 | 2/2005 | Young |
| 6,880,567 B2 | 4/2005 | Klaver et al. |
| 6,880,568 B1 | 4/2005 | Taylor |
| 6,886,593 B2 | 5/2005 | Madden et al. |
| 6,945,569 B1 | 9/2005 | Diaz et al. |
| 6,948,526 B2 | 9/2005 | Seder et al. |
| 6,978,799 B2 | 12/2005 | Kugelev et al. |
| 7,004,445 B2 | 2/2006 | Lymberopoulos |
| 7,028,778 B2 | 4/2006 | Krywitsky |
| 7,028,986 B2 | 4/2006 | Young |
| 7,204,525 B2 | 4/2007 | Matzner |
| 7,207,399 B2 * | 4/2007 | Duhe .................. C02F 1/20 166/265 |
| RE39,695 E | 6/2007 | Ungchusri et al. |
| 7,228,869 B2 | 6/2007 | Wilhelm |
| D549,850 S | 8/2007 | Perlman |
| 7,264,059 B2 | 9/2007 | Akselberg |
| 7,285,190 B2 | 10/2007 | Martin, Jr. |
| 7,302,961 B2 | 12/2007 | Martin et al. |
| D570,501 S | 6/2008 | Janesz et al. |
| 7,398,796 B2 | 7/2008 | Hjorth et al. |
| 7,401,819 B2 | 7/2008 | Gibb et al. |
| 7,451,959 B2 | 11/2008 | Matzner |
| 7,458,212 B2 | 12/2008 | Koizumi et al. |
| 7,516,941 B2 | 4/2009 | Combs |
| 7,549,681 B1 | 6/2009 | Matzner |
| 7,677,526 B2 | 3/2010 | Lymberopoulos |
| 7,819,386 B2 | 10/2010 | Combs |
| 7,823,265 B2 | 11/2010 | Matzner et al. |
| 7,890,276 B2 | 2/2011 | Killion et al. |
| 7,950,409 B2 | 5/2011 | Stokes et al. |
| 8,000,909 B2 | 8/2011 | Danzy |
| 8,051,875 B2 | 11/2011 | Edwards et al. |
| 8,146,665 B2 * | 4/2012 | Neal .................. E21B 21/003 166/250.01 |
| 8,151,885 B2 * | 4/2012 | Bull .................. E21B 43/04 137/561 A |
| D660,461 S | 5/2012 | Kotin et al. |
| D660,984 S | 5/2012 | Kotin et al. |
| 8,196,229 B1 | 6/2012 | Hickok |
| D666,326 S | 8/2012 | Sims |
| 8,261,771 B2 | 9/2012 | Witkowski et al. |
| D675,750 S | 2/2013 | King |
| 8,376,046 B2 | 2/2013 | Broussard, II |
| 8,465,001 B2 | 6/2013 | Witkowski et al. |
| 8,469,108 B2 | 6/2013 | Kajaria et al. |
| 8,474,521 B2 | 7/2013 | Kajaria et al. |
| 8,490,949 B2 | 7/2013 | Lanning et al. |
| 8,590,614 B2 * | 11/2013 | Surjaatmadja ........ F04B 53/10 166/105 |
| D703,294 S | 4/2014 | Witkowski et al. |
| 8,695,627 B2 | 4/2014 | Kugelev et al. |
| D707,332 S | 6/2014 | Witkowski et al. |
| D707,797 S | 6/2014 | Witkowski et al. |
| 8,870,233 B2 | 10/2014 | Matzner et al. |
| 8,978,695 B2 | 3/2015 | Witkowski et al. |
| 8,978,763 B2 * | 3/2015 | Guidry .................. E21B 43/26 166/177.5 |
| 8,998,168 B2 | 4/2015 | Witkowski |
| D734,434 S | 7/2015 | Witkowski et al. |
| 9,127,545 B2 * | 9/2015 | Kajaria .................. E21B 43/26 |
| 2002/0179876 A1 | 12/2002 | Pang et al. |
| 2002/0185867 A1 | 12/2002 | Stachowiak |
| 2002/0186910 A1 | 12/2002 | Maret |
| 2003/0047944 A1 | 3/2003 | Ungchusri et al. |
| 2003/0178067 A1 | 9/2003 | Fredrickson et al. |
| 2004/0163716 A1 | 8/2004 | Madden et al. |
| 2005/0087232 A1 | 4/2005 | Kugelev et al. |
| 2005/0121073 A1 | 6/2005 | Carroll |
| 2005/0199286 A1 | 9/2005 | Appleford et al. |
| 2006/0091339 A1 | 5/2006 | Young |
| 2006/0185731 A1 | 8/2006 | Grable et al. |
| 2006/0266422 A1 | 11/2006 | Feenstra et al. |
| 2006/0278394 A1 | 12/2006 | Stover |
| 2006/0283513 A1 | 12/2006 | Kurian et al. |
| 2007/0029090 A1 | 2/2007 | Andreychuk et al. |
| 2007/0051411 A1 | 3/2007 | Scaramucci et al. |
| 2007/0205387 A1 | 9/2007 | Grau et al. |
| 2007/0262029 A1 | 11/2007 | Yoshida et al. |
| 2007/0272308 A1 | 11/2007 | Spears et al. |
| 2008/0039802 A1 | 2/2008 | Vangsness et al. |
| 2008/0054204 A1 | 3/2008 | Zhou |

(56) References Cited

U.S. PATENT DOCUMENTS

| | | | |
|---|---|---|---|
| 2008/0142752 A1 | 6/2008 | Matzner | |
| 2008/0196773 A1 | 8/2008 | Franconi | |
| 2008/0264649 A1 | 10/2008 | Crawford | |
| 2008/0295910 A1 | 12/2008 | Aleksandersen et al. | |
| 2008/0308159 A1 | 12/2008 | Stunkard | |
| 2009/0120635 A1 | 5/2009 | Neal | |
| 2010/0154894 A1 | 6/2010 | Kotapish et al. | |
| 2010/0193057 A1 | 8/2010 | Garner et al. | |
| 2010/0258200 A1 | 10/2010 | Walker et al. | |
| 2010/0288493 A1 | 11/2010 | Fielder et al. | |
| 2010/0300672 A1* | 12/2010 | Childress | E21B 43/26 166/52 |
| 2011/0036415 A1 | 2/2011 | Lymberopoulos | |
| 2011/0048695 A1* | 3/2011 | Cherewyk | E21B 21/062 166/90.1 |
| 2011/0061871 A1 | 3/2011 | Omvik | |
| 2011/0125332 A1* | 5/2011 | Heitman | F04B 49/065 700/282 |
| 2011/0126930 A1* | 6/2011 | Hayashi | F16L 23/10 137/561 R |
| 2011/0240126 A1 | 10/2011 | Lymberopoulos et al. | |
| 2011/0259584 A1* | 10/2011 | Broussard, II | E21B 34/02 166/271 |
| 2011/0272158 A1* | 11/2011 | Neal | B67D 7/36 166/305.1 |
| 2011/0316274 A1 | 12/2011 | Groenlund et al. | |
| 2012/0025114 A1 | 2/2012 | Lymberopoulos et al. | |
| 2012/0031494 A1 | 2/2012 | Lymberopoulos | |
| 2012/0060929 A1* | 3/2012 | Kendrick | E21B 21/062 137/1 |
| 2012/0073670 A1 | 3/2012 | Lymberopoulos | |
| 2012/0085541 A1 | 4/2012 | Love et al. | |
| 2012/0091743 A1 | 4/2012 | Ohman, III et al. | |
| 2012/0181013 A1* | 7/2012 | Kajaria | E21B 43/26 166/79.1 |
| 2012/0181015 A1 | 7/2012 | Kajaria et al. | |
| 2012/0181016 A1 | 7/2012 | Kajaria et al. | |
| 2012/0181046 A1* | 7/2012 | Kajaria | E21B 43/26 166/380 |
| 2012/0219354 A1 | 8/2012 | Bauer et al. | |
| 2012/0227983 A1 | 9/2012 | Lymberopoulos et al. | |
| 2012/0255734 A1 | 10/2012 | Coli et al. | |
| 2012/0298213 A1 | 11/2012 | Forster et al. | |
| 2012/0325332 A1 | 12/2012 | Ball et al. | |
| 2013/0020519 A1 | 1/2013 | Lymberopoulos | |
| 2013/0032328 A1* | 2/2013 | Guidry | E21B 43/26 166/177.5 |
| 2013/0037125 A1 | 2/2013 | Drake et al. | |
| 2013/0126152 A1 | 5/2013 | Banks et al. | |
| 2013/0248182 A1 | 9/2013 | Chong et al. | |
| 2013/0284455 A1* | 10/2013 | Kajaria | E21B 43/26 166/379 |
| 2014/0048158 A1 | 2/2014 | Baca et al. | |
| 2014/0048255 A1 | 2/2014 | Baca et al. | |
| 2014/0048734 A1 | 2/2014 | Witkowski et al. | |
| 2014/0318777 A1* | 10/2014 | Fontenelle | E21B 37/06 166/278 |
| 2015/0000766 A1* | 1/2015 | Arizpe | F16L 41/03 137/356 |
| 2015/0042088 A1 | 2/2015 | Witkowski et al. | |
| 2015/0292297 A1* | 10/2015 | Kajaria | E21B 34/02 166/250.01 |
| 2015/0300545 A1* | 10/2015 | Hayashi | F16L 23/10 137/343 |
| 2015/0337861 A1* | 11/2015 | Hokey | F04D 29/663 137/343 |
| 2015/0345646 A1 | 12/2015 | Witkowski et al. | |

FOREIGN PATENT DOCUMENTS

| | | |
|---|---|---|
| AU | 348253 | 5/2013 |
| CA | 2350047 A1 | 12/2001 |
| CA | 2635751 A1 | 12/2001 |
| CA | 2636751 A1 | 1/2009 |
| CA | 2490664 C | 11/2009 |
| CA | 2485817 C | 8/2010 |
| CA | 2654848 A1 | 8/2010 |
| CA | 2503231 C | 6/2011 |
| CA | 2612397 C | 4/2013 |
| CA | 149748 | 11/2014 |
| CA | 152956 | 11/2014 |
| CA | 152957 | 11/2014 |
| CA | 2764310 | 6/2015 |
| CN | 2118877 U | 10/1992 |
| CN | 1137309 A | 12/1996 |
| CN | 1225298 A | 8/1999 |
| CN | 2426550 Y | 4/2001 |
| CN | 1548701 A | 11/2004 |
| CN | 1548701 U | 11/2004 |
| CN | 2901281 Y | 5/2007 |
| CN | 200999609 U | 1/2008 |
| CN | 201043685 Y | 4/2008 |
| CN | 101205798 A | 6/2008 |
| CN | 101258350 A | 9/2008 |
| CN | 101303033 A | 11/2008 |
| CN | 101367099 A | 2/2009 |
| CN | 201206648 Y | 3/2009 |
| CN | 201262043 Y | 6/2009 |
| CN | 101539218 A | 9/2009 |
| CN | 101722221 A | 6/2010 |
| CN | 201496006 U | 6/2010 |
| CN | 201545914 U | 8/2010 |
| CN | 201650157 U | 11/2010 |
| CN | 201739525 U | 2/2011 |
| CN | 201747313 U | 2/2011 |
| CN | 202047762 U | 11/2011 |
| CN | 102323158 A | 1/2012 |
| CN | 202144943 U | 2/2012 |
| CN | 202208237 U | 5/2012 |
| CN | 202255848 U | 5/2012 |
| CN | 202255937 U | 5/2012 |
| CN | 202718658 U | 2/2013 |
| CN | ZL2013300399164 | 9/2013 |
| CN | ZL201330441389 | 4/2014 |
| CN | ZL2010800253503 | 5/2014 |
| CN | ZL2013304412416 | 5/2014 |
| DE | 1166571 B | 3/1964 |
| DE | 2415732 A1 | 10/1974 |
| DE | 2358756 A1 | 3/1975 |
| DE | 2558272 A1 | 7/1977 |
| DE | 2642743 A1 | 3/1978 |
| DE | 218416 A1 | 2/1985 |
| DE | 3341643 A1 | 5/1985 |
| DE | 19707228 A1 | 8/1998 |
| DE | 102004033453 A1 | 1/2006 |
| EA | 201171356 A1 | 5/2012 |
| EM | ECD-002185371-001 | 2/2013 |
| EM | ECD-002307421-0001 | 9/2013 |
| EM | ECD-002307421-0002 | 9/2013 |
| EP | 0044619 A1 | 1/1982 |
| EP | 0559131 B1 | 1/1996 |
| EP | 1219942 B1 | 8/2004 |
| EP | 1488867 A1 | 12/2004 |
| FR | 2635476 A1 | 2/1990 |
| GB | 255970 A | 8/1926 |
| GB | 578008 A | 6/1946 |
| GB | 619950 A | 3/1949 |
| GB | 731895 A | 6/1955 |
| GB | 1536728 A | 12/1978 |
| GB | 2056626 A | 3/1981 |
| GB | 2117822 A | 10/1983 |
| GB | 2140338 A | 11/1984 |
| GB | 2185287 A | 7/1987 |
| GB | 2228885 A | 9/1990 |
| GB | 2312728 B | 5/2000 |
| GB | 2355510 A | 4/2001 |
| GB | 2408562 A | 1/2005 |
| GB | 2416574 B | 8/2008 |
| GB | 2413606 B | 3/2009 |
| GB | 2444822 B | 6/2011 |
| GB | 2452801 B | 4/2012 |
| GB | 2493900 A | 2/2013 |

(56) References Cited

FOREIGN PATENT DOCUMENTS

| | | |
|---|---|---|
| GB | 2521300 A | 6/2015 |
| IN | 251691 | 8/2012 |
| JP | 53108873 A | 9/1978 |
| JP | 53125261 A | 11/1978 |
| JP | 57073187 | 5/1982 |
| JP | 57079400 A | 5/1982 |
| JP | 61093344 | 5/1986 |
| JP | 5033883 A | 2/1993 |
| JP | 08075022 | 3/1996 |
| JP | 08128536 | 5/1996 |
| JP | 08291543 | 5/1996 |
| JP | 08300052 | 11/1996 |
| JP | 10175026 | 6/1998 |
| JP | 2000330646 | 11/2000 |
| JP | 2001355774 | 12/2001 |
| JP | 2002098068 | 4/2002 |
| JP | 2004190769 A | 7/2004 |
| JP | 2006194334 A | 7/2006 |
| JP | D1285004 | 9/2006 |
| JP | 2008215626 A | 9/2008 |
| JP | 4996990 B2 | 5/2012 |
| KR | 100540389 B1 | 12/2005 |
| KR | 100540390 B1 | 12/2005 |
| KR | 100540392 B1 | 12/2005 |
| KR | 100621158 B1 | 8/2006 |
| KR | 100716760 B1 | 5/2007 |
| KR | 100832065 B1 | 5/2008 |
| KR | 101191630 B1 | 10/2012 |
| MX | 2011011007 A | 2/2012 |
| MX | 40533 | 12/2013 |
| MX | 324905 | 10/2014 |
| RU | 1466084 C | 6/1995 |
| RU | 1417281 C | 7/1995 |
| RU | 2088831 C1 | 8/1997 |
| RU | 2242313 C2 | 12/2004 |
| RU | 2367770 C1 | 9/2009 |
| RU | 2367771 C1 | 9/2009 |
| SG | 175263 | 11/2012 |
| SG | 176534 | 11/2012 |
| SG | D2013/186 G | 2/2013 |
| SU | 567001 A1 | 7/1977 |
| SU | 585898 A1 | 12/1977 |
| SU | 1391769 A1 | 4/1988 |
| SU | 1721368 A1 | 3/1992 |
| WO | WO-9713398 A2 | 4/1997 |
| WO | WO-9956047 A2 | 11/1999 |
| WO | WO 2009023042 A1 | 2/2009 |
| WO | WO-2010080636 A2 | 7/2010 |
| WO | WO-2010123889 A2 | 10/2010 |
| WO | WO-2010141651 A2 | 12/2010 |
| WO | WO-2010151680 A2 | 12/2010 |
| WO | WO-2011095453 A1 | 8/2011 |
| WO | WO-2013023154 A1 | 2/2013 |
| WO | WO-2014028498 | 2/2014 |
| WO | WO-2014028795 | 2/2014 |
| WO | WO-2015002863 A1 | 1/2015 |

OTHER PUBLICATIONS

"Notice of Allowance mailed Dec. 17, 2015, by the USPTO, re U.S. Appl. No. 13/886,771".
"Notice of Allowance mailed Oct. 27, 2015, by the USPTO, re U.S. Appl. No. 13/964,863".
"Office Action mailed Jul. 10, 2015, by the USPTO, re U.S. Appl. No. 13/964,863".
U.S. Appl. No. 29/453,837, filed May 3, 2013, Fuller; Nadiya, et al.
U.S. Appl. No. 60/653,014, filed Feb. 15, 2015, Matzner; Mark et al.
U.S. Appl. No. 60/947,738, filed Jul. 3, 2007, Matzner; Mark, et al.
U.S. Appl. No. 61/170,917, filed Apr. 20, 2009, Witkowski; Brian et al.
U.S. Appl. No. 61/220,067, filed Jun. 24, 2009, Kugelev, Vladimir, et al.
U.S. Appl. No. 61/522,234, filed Aug. 10, 2011, Drake, Philip et al.
"Advisory Action mailed May 20, 2013, by the USPTO, re U.S. Appl. No. 12/165,680".
An Introduction to Rupture Disk Technology catalog, BS&B Safety Systems, 1994.
"Australian Exam Report, issued Sep. 25, 2014, by IP Australia, re App No. 2010239366".
"Brazil Office Action, dated Jun. 3, 2014, re App No. BR3020130006611".
"Canadian Exam Report dated Jul. 29, 2014, issued by CIPO, re App No. 2636751".
"Canadian Examination Report, by CIPO, mailed Feb. 10, 2014, re App No. 152956".
"Canadian Examination Report dated Apr. 28, 2014, by the CIPO, re App No. 2764310".
"Canadian Examination Report dated Feb. 7, 2014, by the CIPO, re App No. 149748".
"Canadian Examiner's Report issued Feb. 10, 2014, by CIPO, re App No. 152957".
"Chinese Office Action dated Jun. 5, 2013, re App No. 2010800253503".
"Second Written Opinion, by the IPEA/US, mailed Jul. 28, 2014, re PCT/US2013/054741".
Emergency Relief Valve Brochure, SPM, 1997.
"Eurasian Office Action issued Nov. 19, 2013, by The Eurasian Patent Office, re App No. 201171356".
"European Exam Report, by the EPO, dated Apr. 8, 2014, re App No. 10784052.2".
"European Search Report mailed Mar. 14, 2013, re corresponding EP App No. 10767632".
"Examination Report by IP India, dated Apr. 26, 2013, re App No. 251691".
"Extended European Search Report, by the EP Patent Office, dated Mar. 14, 2013, re App No. 10767632.2".
"Extended European Search Report, issued Jul. 4, 2013, re App No. 10784052.2".
"Final Office Action mailed Apr. 25, 2014, by the USPTO, re U.S. Appl. No. 13/608,562".
"Final Office Action mailed Aug. 16, 2013, by the USPTO, re U.S. Appl. No. 12/822,900".
"Final Office Action mailed Feb. 28, 2014, by the USPTO, re U.S. Appl. No. 12/165,680".
"Final Office Action mailed Jan. 31, 2012, by the USPTO, re U.S. Appl. No. 12/165,680".
"Final Office Action mailed Jan. 5, 2015, by the USPTO, re U.S. Appl. No. 13/572,293".
"Final Office Action mailed Mar. 7, 2013, by the USPTO, re U.S. Appl. No. 12/165,680".
"Final Office Action mailed Nov. 6, 2014, by the USPTO, re U.S. Appl. No. 13/965,848".
"International Preliminary Report on Patentability, by the IPEA/US, mailed Nov. 17, 2014, re PCT/US2013/054741".
"International Preliminary Report on Patentability mailed Jul. 15, 2013, regarding PCT/US2012/050376".
"International Search Report and Written Opinion by the ISA/US, mailed Feb. 7, 2014, re PCT/US2013/054741".
International Search Report and Written Opinion for Application No. PCT/US2009/068822 mailed on Aug. 9, 2010, 7 pages.
International Search Report and Written Opinion for Application No. PCT/US2010/031738 mailed on Dec. 27, 2010, 7 pages.
International Search Report and Written Opinion for Application No. PCT/US2010/037156 mailed on Jan. 13, 2011, 8 pages.
International Search Report and Written Opinion for Application No. PCT/US2010/039834 mailed on Feb. 8, 2011, 6 pages.
International Search Report and Written Opinion for Application No. PCT/US2012/050376 mailed on Oct. 26, 2012, 10 pages.
"International Search Report and Written Opinion, mailed Jan. 23, 2015, by the ISA/EP, re PCT/US2013/055257".
"Notice of Allowance mailed Apr. 10, 2015, by the USPTO, re U.S. Appl. No. 29/493,861".
"Notice of Allowance mailed Apr. 9, 2015, by the USPTO, re U.S. Appl. No. 13/965,848".

(56) References Cited

OTHER PUBLICATIONS

"Notice of Allowance mailed Aug. 29, 2005, by the USPTO, re U.S. Appl. No. 10/690,888".
"Notice of Allowance mailed Dec. 17, 2014, by the Canadian IP Office, re App No. 2764310".
"Notice of Allowance mailed Dec. 20, 2012, by the Canadian IP Office, re App No. 2,612,397".
"Notice of Allowance mailed Dec. 26, 2014, by the USPTO, re U.S. Appl. No. 13/918,479".
"Notice of Allowance mailed Feb. 11, 2009, by the USPTO, re U.S. Appl. No. 11/414,984".
"Notice of Allowance mailed Feb. 12, 2007, by the USPTO, re U.S. Appl. No. 11/013,486".
"Notice of Allowance mailed Feb. 19, 2013, by the USPTO, re U.S. Appl. No. 12/793,194".
"Notice of Allowance mailed Feb. 7, 2014, by the USPTO, re U.S. Appl. No. 29/449,852".
"Notice of Allowance mailed Feb. 7, 2014, by the USPTO, re U.S. Appl. No. 29/449,867".
"Notice of Allowance mailed Jan. 16, 2014, by the USPTO, re U.S. Appl. No. 29/453,837".
"Notice of Allowance mailed Jul. 6, 2005, by the USPTO, re U.S. Appl. No. 10/833,859".
"Notice of Allowance mailed Jun. 25, 2014, by the USPTO, re U.S. Appl. No. 12/165,680".
"Notice of Allowance mailed Jun. 29, 2010, by the USPTO, re U.S. Appl. No. 11/354,663".
"Notice of Allowance mailed May 16, 2012, by the USPTO, re U.S. Appl. No. 12/763,786".
"Notice of Allowance mailed Nov. 22, 2013, by the USPTO, re U.S. Appl. No. 12/822,900".
"Notice of Allowance mailed Nov. 26, 2013, by the USPTO, re U.S. Appl. No. 29/429,809".
"Notice of Allowance mailed Nov. 28, 2014, by the USPTO, re U.S. Appl. No. 13/608,562".
"Notice of Allowance mailed Sep. 23, 2008, by the USPTO, re U.S. Appl. No. 11/638,965".
"Office Action dated May 31, 2011, from the UK IP Office, re App No. G80812086.7".
"Office Action mailed Apr. 30, 2015, by the USPTO, re U.S. Appl. No. 13/886,771".
"Office Action mailed Apr. 4, 2008, by the USPTO, re U.S. Appl. No. 11/638,965".
"Office Action mailed Aug. 30, 2005, by the USPTO, re U.S. Appl. No. 11/013,486".
"Office Action mailed Aug. 9, 2011, by the USPTO, re U.S. Appl. No. 12/165,680".
"Office Action mailed Dec. 22, 2004, by the USPTO, re U.S. Appl. No. 10/833,859".
"Office Action mailed Dec. 30, 1996, by the USPTO, re U.S. Appl. No. 08/643,239".
"Office Action mailed Dec. 6, 2012, by the USPTO, re U.S. Appl. No. 12/822,900".
"Office Action mailed Jan. 8, 2010, by the USPTO, re U.S. Appl. No. 11/354,663".
"Office Action mailed Jul. 12, 2013, by the USPTO, re U.S. Appl. No. 12/165,680".
"Office Action mailed Jul. 31, 2014, by the USPTO, re U.S. Appl. No. 13/965,848".
"Office Action mailed Jun. 18, 2014, by the USPTO, re U.S. Appl. No. 13/572,293".
"Office Action mailed Mar. 19, 2012, by the USPTO, re U.S. Appl. No. 12/642,541".
"Office Action mailed Mar. 27, 2014, by the USPTO, re U.S. Appl. No. 13/918,479".
"Office Action mailed Nov. 17, 1983, by the USPTO, re U.S. Appl. No. 06/419,141".
"Office Action mailed Oct. 11, 2011, by the USPTO, re U.S. Appl. No. 12/763,786".
"Office Action mailed Oct. 25, 2012, by the USPTO, re U.S. Appl. No. 12/793,194".
"Office Action mailed Sep. 13, 2013, by the USPTO, re U.S. Appl. No. 13/608,562".
"Oksanen, "Singer Model DLA-RPS Air operated surge anticipating electrically timed sewage relief valve," Dec. 8, 2010, XP055159354".
One page showing 4" Halliburton Big Inch Clamp Connection.
Pop Off Valve information, BJ 285959, BJ Services.
Reset Relief Valves brochure, Harrisburg, Inc., 1982.
"Russian Office Action, issued by the Russian Patent Office, re App No. 2013500548".
SPM Flow Control, Inc., 4-Inch Integral Swivel Joint.
SPM Flow Control, Inc., "Flow Control Products and Drilling Equipment for the Worldwide Petroleum Industry," [Online] Jan. 8, 2007, &It;URL:www.spmflo.com>.
SPM Flow Control, Inc., High-Pressure Long Radius Swivel Joints, 2002, www.spmflo.com.
SPM Flow Control, Inc., Long Radius Swivel Joints, H2S, Operating and Maintenance Instructions, 1999.
SPM Flow Control, Inc., Long Radius Swivel Joints, Operating and Maintenance Instructions, 2004.
SPM Flow Control, Inc., Long Radius Swivel Joints, Operating and Maintenance Instructions, 2006.
SPM Flow Control, Inc., Swivel Joints, 1999, www.spmflo.com.
SPM Flow Control, Inc., Weir SPM, Long Radius Swivel Joints, 2007.
Supplementary European Search Report for Application No. EP09838004 mailed on Jan. 30, 2013, 4 pages.
Two-pages of Grayloc Products, Houston, Texas 77252 showing Grayloc Connectors in Extreme Service.
Valve illustration, Retsco Inc., 1992.
Venture Oilfield Services Ltd. Drawing Titled: Flowline's Safety Clamp.
International Search Report and Written Opinion for PCT/US2014/044813 prepared by ISA/US on Dec. 9, 2014, 12 pages.
"10 Station AFAM Trailer", FMC, Oct. 28, 2011, 6 pages.
Weir SPM Safety Iron Manifold Trailer, 2008, 2 pages.

* cited by examiner

MANIFOLD ASSEMBLY

CROSS-REFERENCE TO RELATED APPLICATION

This application claims the benefit of the filing date of, and priority to, U.S. patent application No. 61/841,753, filed Jul. 1, 2013, the entire disclosure of which is hereby incorporated herein by reference.

TECHNICAL FIELD

This disclosure relates in general to manifold assemblies and, in particular, a manifold assembly that includes a low pressure manifold and a high pressure manifold.

BACKGROUND OF THE DISCLOSURE

A manifold assembly may include a low pressure manifold and a high pressure manifold. Such a manifold assembly may be used to hydraulically fracture (or "frac") a subterranean formation by conveying pressurized fluid to a wellbore that extends within the subterranean formation, thereby facilitating oil and gas exploration and production operations. In some cases, the high and/or low pressure manifolds may vibrate or otherwise experience dynamic loading, which dynamic loading may ultimately affect the integrity, or operation, of the manifold(s). This dynamic loading may be caused by, for example, a blender in fluid communication with the low pressure manifold. For another example, this vibration or dynamic loading may be caused by one or more pumps, each of which is in fluid communication with one, or both, of the high and low pressure manifolds and is used to pressurize the fluid to be conveyed to the wellbore. In addition to, or instead of, issues related to dynamic loading, it is sometimes difficult to inspect, service or repair the manifold assembly, or to inspect, service, repair or replace components of the manifold assembly. Still further, if the manifold assembly is mounted on a trailer, height restrictions may limit or constrain the structural arrangement of the manifold assembly. Therefore, what is needed is an assembly, apparatus or method that addresses one or more of the foregoing issues, among others.

SUMMARY

In a first aspect, there is provided a manifold assembly that includes a skid; a low pressure manifold connected to the skid, the low pressure manifold including one or more flow lines through which fluid is adapted to flow, and a plurality of ports connected to the one or more flow lines and via which respective portions of the fluid are adapted to flow to corresponding pumps in a plurality of pumps; a high pressure manifold connected to the skid, the high pressure manifold including a plurality of fittings, each of the respective portions of the fluid being adapted to flow through at least one of the fittings in the plurality of fittings after exiting the corresponding pump; and a plurality of vibration isolators to dampen dynamic loading, the plurality of vibration isolators being disposed between the fittings and the one or more flow lines.

In an exemplary embodiment, at least one of the vibration isolators includes at least one of the following: a helical cable isolator; and a two-piece mount.

In another exemplary embodiment, the manifold assembly includes another plurality of vibration isolators to dampen dynamic loading, the another plurality of vibration isolators being disposed between the skid and the one or more flow lines.

In yet another exemplary embodiment, the high pressure manifold further includes a first mounting bracket connected to the skid; and a second mounting bracket to which one or more of the fittings in the plurality of fittings is connected; and wherein at least one of the vibration isolators is disposed between the first and second mounting brackets.

In certain exemplary embodiments, the first mounting bracket is disposed above the one or more flow lines and the plurality of ports of the low pressure manifold; wherein the at least one of the vibration isolators is disposed above the first mounting bracket; wherein the second mounting bracket is disposed above the at least one of the vibration isolators; and wherein the one or more of the fittings are disposed above the second mounting bracket.

In an exemplary embodiment, the high pressure manifold further includes at least one post extending downward from the first mounting bracket and connected to the skid.

In another exemplary embodiment, the manifold assembly further includes a carrier bracket adapted to support a swivel and connected to the at least one post.

In a second aspect, there is provided a manifold assembly that includes a skid; a low pressure manifold connected to the skid; and a high pressure manifold connected to the skid; wherein the high pressure manifold has a modular configuration so that the high pressure manifold is disconnectable in whole or in part from the skid, and reconnectable in whole or in part to the skid.

In an exemplary embodiment, the high pressure manifold includes a plurality of high pressure modules; wherein the high pressure manifold is disconnected in whole from the skid by at least moving in whole the plurality of high pressure modules relative to the skid; wherein the high pressure manifold is disconnected in part from the skid by at least moving at least one of the high pressure modules relative to the skid; wherein the high pressure manifold is reconnected in whole to the skid by at least moving in whole the plurality of high pressure modules relative to the skid; and wherein the high pressure manifold is reconnected in part to the skid by at least moving the at least one of the high pressure modules relative to the skid.

In another exemplary embodiment, at least one of the high pressure modules includes a port adapted to be in fluid communication with the corresponding at least one pump; and a fitting in fluid communication with the port.

In yet another exemplary embodiment, at least one of the high pressure modules provides a vertical offset between the fitting of the high pressure module and each of the low pressure manifold and the skid when the high pressure module is connected to the skid; and a horizontal surface upon which the high pressure module is adapted to rest when the high pressure module is disconnected from the skid; and wherein the vertical offset facilitates serviceability of the fitting regardless of whether the high pressure module is connected to the skid.

In certain exemplary embodiments, the vertical offset is adjustable.

In an exemplary embodiment, each of the high pressure modules further includes a first mounting bracket connected to the skid; at least one vibration isolator connected to the first mounting bracket; and a second mounting bracket connected to the at least one vibration isolator so that the vibration isolator is disposed between the first and second mounting brackets; wherein the fitting and the port are mounted to the second mounting bracket.

In another exemplary embodiment, each of the high pressure modules further includes a carrier bracket adapted to support a swivel.

In yet another exemplary embodiment, the manifold assembly includes another low pressure manifold disposed above the high pressure manifold; and another high pressure manifold disposed above the another low pressure manifold.

In certain exemplary embodiments, the manifold assembly includes another low pressure manifold that is generally coplanar with the low pressure manifold; and another high pressure manifold disposed above the high pressure manifold.

In an exemplary embodiment, the manifold assembly includes another low pressure manifold that is generally coplanar with the low pressure manifold; and another high pressure manifold disposed above the another low pressure manifold and generally coplanar with the high pressure manifold.

In a third aspect, there is provided a high pressure module adapted to form part of a high pressure manifold used to hydraulically fracture a subterranean formation within which a wellbore extends, the high pressure module including a fitting adapted to receive pressurized fluid from a pump and convey the pressurized fluid to the wellbore; a first mounting bracket to which the fitting is connected; and a plurality of posts extending downwardly from the first mounting bracket and adapted to be connected to a skid, the plurality of posts providing a vertical offset between the fitting and the skid when the posts are connected to the skid; wherein the high pressure module is adapted to be connected to, and in fluid communication with, another high pressure module.

In an exemplary embodiment, the high pressure module includes a second mounting bracket on which the fitting is disposed; and a vibration isolator disposed between the first and second mounting brackets; wherein the first mounting bracket is disposed above the skid; wherein the vibration isolator is disposed above the first mounting bracket; wherein the second mounting bracket is disposed above the vibration isolator; wherein the fitting is disposed above the second mounting bracket.

In yet another exemplary embodiment, the high pressure module includes a carrier bracket adapted to support a swivel and connected to one post in the plurality of posts.

In certain exemplary embodiments, the vertical offset is between the fitting and a horizontal surface when the posts are not connected to the skid and instead engage the horizontal surface so that the high pressure module is supported by the horizontal surface.

In a fourth aspect, there is provided a module adapted to form part of a manifold used to hydraulically fracture a subterranean formation within which a wellbore extends, and the module includes: a first mounting bracket; a first port connected to the first mounting bracket and adapted to be in fluid communication with a first pump, wherein the first pump is adapted to pressurize fluid to be conveyed to the wellbore to hydraulically fracture the subterranean formation within which the wellbore extends; a second port connected to the first mounting bracket and adapted to be in fluid communication with a second pump that is different from the first pump, wherein the second pump is adapted to pressurize fluid to be conveyed to the wellbore to hydraulically fracture the subterranean formation within which the wellbore extends; and a first fitting connected to the first mounting bracket and in fluid communication with at least one of the first and second ports. The module is adapted to be connected to, and in fluid communication with, another module used to hydraulically fracture the subterranean formation within which the wellbore extends.

In an exemplary embodiment, the first fitting is adapted to receive pressurized fluid from at least one of the first and second pumps and convey the pressurized fluid to the wellbore.

In another exemplary embodiment, the module includes a second fitting connected to the first mounting bracket and in fluid communication with the other of the first and second ports.

In yet another exemplary embodiment, the first fitting is in fluid communication with the first port and is adapted to be in fluid communication with the first pump, the second fitting is in fluid communication with the second port and is adapted to be in fluid communication with the second pump, and the first and second fittings are adapted to receive pressurized fluid from the first and second pumps, respectively, and convey the pressurized fluid to the wellbore.

In certain exemplary embodiments, the module includes at least one post extending from the first mounting bracket and adapted to engage either a skid or another horizontal surface to provide a vertical offset between the first fitting and either the skid or the horizontal surface, the vertical offset facilitating serviceability of the fitting.

In an exemplary embodiment, the module includes a second mounting bracket connected to the first mounting bracket and on which the first fitting and the first and second ports are mounted.

In another exemplary embodiment, the module includes at least one vibration isolator connecting, and disposed between, the first and second mounting brackets.

In yet another exemplary embodiment, the first mounting bracket defines first and second sides spaced in a parallel relation, the first fitting and the first and second ports are mounted on the first side of the first mounting bracket, and the module includes: at least one vibration isolator connected to the first mounting bracket on the second side thereof; and a second mounting bracket connected to the at least one vibration isolator so that the vibration isolator is disposed between the first and second mounting brackets.

In certain exemplary embodiments, the module includes first and second isolation valves mounted on the first mounting bracket and in fluid communication with the first and second ports, respectively; wherein the first fitting is in fluid communication with at least the first isolation valve.

In an exemplary embodiment, the module includes a second fitting in fluid communication with the second isolation valve.

In a fifth aspect, there is provided a module adapted to connect to a skid and form part of a manifold used to hydraulically fracture a subterranean formation within which a wellbore extends, and the module includes: a first mounting bracket; a first port connected to the first mounting bracket and adapted to be in fluid communication with a first pump, wherein the first pump is adapted to pressurize fluid to be conveyed to the wellbore to hydraulically fracture the subterranean formation within which the wellbore extends; a first fitting connected to the first mounting bracket and in fluid communication with the first port; and at least one post extending from the first mounting bracket and adapted to engage the skid when the module is connected to the skid, the at least one post being disconnectable from, and reconnectable to, the skid. At least the first mounting bracket, the first port, the first fitting, and the at least one post are all disconnectable together from, and all reconnectable together to, the skid. The module is adapted to be connected to, and in fluid communication with, another module used to hydraulically fracture the subterranean formation within which the wellbore extends.

In an exemplary embodiment, when the at least one post engages either the skid or another horizontal surface, the at least one post provides a vertical offset between the first fitting and either the skid or the horizontal surface to facilitate serviceability of the first fitting.

In another exemplary embodiment, the at least one post permits the vertical offset to be adjustable with respect to at least the skid.

In yet another exemplary embodiment, the first fitting is adapted to receive pressurized fluid from the first pump and convey the pressurized fluid to the wellbore.

In certain exemplary embodiments, the module includes a second port connected to the first mounting bracket and adapted to be in fluid communication with a second pump that is different from the first pump, wherein the second pump is adapted to pressurize fluid to be conveyed to the wellbore to hydraulically fracture the subterranean formation within which the wellbore extends; and a second fitting connected to the first mounting bracket and in fluid communication with the second port; wherein at least the first mounting bracket, the first and second ports, the first and second fittings, and the at least one post are all disconnectable together from, and all reconnectable together to, the skid.

In an exemplary embodiment, the first and second fittings are adapted to receive pressurized fluid from the first and second pumps, respectively, and convey the pressurized fluid to the wellbore.

In another exemplary embodiment, the module includes first and second isolation valves connected to the first mounting bracket and in fluid communication with the first and second ports, respectively; wherein the first and second fittings are in fluid communication with the first and second isolation valves, respectively; and wherein at least the first mounting bracket, the first and second ports, the first and second fittings, the at least one post, and the first and second isolation valves are all disconnectable together from, and all reconnectable together to, the skid.

In yet another exemplary embodiment, the module includes at least one vibration isolator connected to the first mounting bracket; wherein at least the first mounting bracket, the first port, the first fitting, the at least one post, and the at least one vibration isolator are all disconnectable together from, and all reconnectable together to, the skid.

In certain exemplary embodiments, the module includes a second mounting bracket connected to the at least one vibration isolator so that the at least one vibration isolator is disposed between the first and second mounting brackets; wherein the first fitting and the first port are mounted on the second mounting bracket; and wherein at least the first and second mounting brackets, the first port, the first fitting, the at least one post, and the at least one vibration isolator are all disconnectable together from, and all reconnectable together to, the skid.

In a sixth aspect, there is provided a module adapted to form part of a manifold used to hydraulically fracture a subterranean formation within which a wellbore extends, and the module includes: a first mounting bracket; a second mounting bracket spaced in a parallel relation from the first mounting bracket; a first fitting mounted on the second mounting bracket; a first isolation valve mounted on the second mounting bracket and in fluid communication with the first fitting, wherein the first isolation valve is adapted to be in fluid communication with a first pump, wherein the first pump is adapted to pressurize fluid to be conveyed to the wellbore to hydraulically fracture the subterranean formation within which the wellbore extends; a first vibration isolator disposed between the first and second mounting brackets and proximate the first fitting; and a second vibration isolator disposed between the first and second mounting brackets and proximate the first isolation valve; wherein at least one of the first and second vibration isolators includes at least one of a helical cable isolator and a two-piece mount; and wherein the module is disconnectable from, and reconnectable to, another module used to hydraulically fracture the subterranean formation within which the wellbore extends.

In an exemplary embodiment, the first fitting is adapted to receive pressurized fluid from the first pump and convey the pressurized fluid to the wellbore.

In another exemplary embodiment, the module includes a second isolation valve mounted on the second mounting bracket and adapted to be in fluid communication with a second pump that is different from the first pump, wherein the second pump is adapted to pressurize fluid to be conveyed to the wellbore to hydraulically fracture the subterranean formation within which the wellbore extends; and a third vibration isolator disposed between the first and second mounting brackets and proximate the second isolation valve, the third vibration isolator including at least one of a helical cable isolator and a two-piece mount.

In yet another exemplary embodiment, the module includes a second fitting mounted on the second mounting bracket and in fluid communication with the second isolation valve; and a fourth vibration isolator disposed between the first and second mounting brackets and proximate the second fitting, the fourth vibration isolator including at least one of a helical cable isolator and a two-piece mount.

In certain exemplary embodiments, the first and second fittings are adapted to receive pressurized fluid from the first and second pumps, respectively, and convey the pressurized fluid to the wellbore.

In an exemplary embodiment, the module is adapted to be connected to a skid, the module includes at least one post extending from the first mounting bracket and adapted to engage the skid when the module is connected to the skid, the at least one post being disconnectable from, and reconnectable to, the skid, and at least the first and second mounting brackets, the first isolation valve, the first fitting, the first and second vibration isolators, and the at least one post are all disconnectable together from, and all reconnectable together to, the skid.

In another exemplary embodiment, when the at least one post engages either the skid or another horizontal surface, the at least one post provides a vertical offset between the first fitting and either the skid or the horizontal surface to facilitate serviceability of the first fitting.

In yet another exemplary embodiment, the at least one post permits the vertical offset to be adjustable with respect to at least the skid.

In a seventh aspect, there is provided a method including at least one step according to one or more aspects of the present disclosure.

Other aspects, features, and advantages will become apparent from the following detailed description when taken in conjunction with the accompanying drawings, which are a part of this disclosure and which illustrate, by way of example, principles of the inventions disclosed.

DESCRIPTION OF FIGURES

The accompanying drawings facilitate an understanding of the various embodiments.

DETAILED DESCRIPTION

Figure 1:
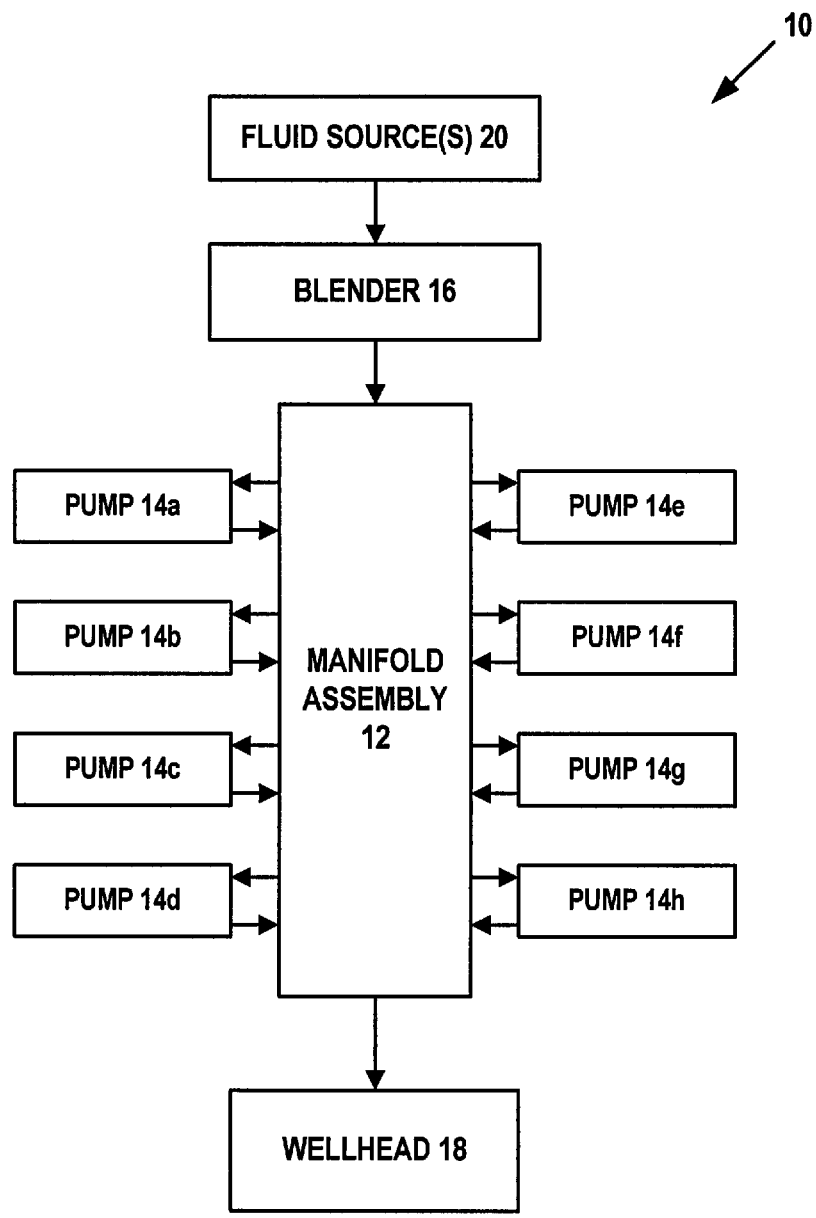
FIG. 1 is a diagrammatic view of a system according to an exemplary embodiment, the system including a manifold assembly.

In an exemplary embodiment, as illustrated in FIG. 1, a system is generally referred to by the reference numeral 10 and includes a manifold assembly 12. Pumps 14a-14h, a blender 16, and a wellhead 18 are in fluid communication with the manifold assembly 12. One or more fluid sources 20 are in fluid communication with the blender 16. The wellhead 18 is the surface termination of a wellbore (not shown). In an exemplary embodiment, the one or more fluid sources 20 include one or more fluid storage tanks, other types of fluid sources, natural water features, or any combination thereof. In an exemplary embodiment, the system 10 is part of a hydraulic fracturing (or "frac") system, which may be used to facilitate oil and gas exploration and production operations. The exemplary embodiments provided herein are not limited to a hydraulic fracturing system as the exemplary embodiments may be used with, or adapted to, a mud pump system, a well treatment system, other pumping systems, one or more systems at the wellhead 18, one or more systems in the wellbore of which the wellhead 18 is the surface termination, one or more systems downstream of the wellhead 18, or one or more other systems associated with the wellhead 18.

Figure 2:
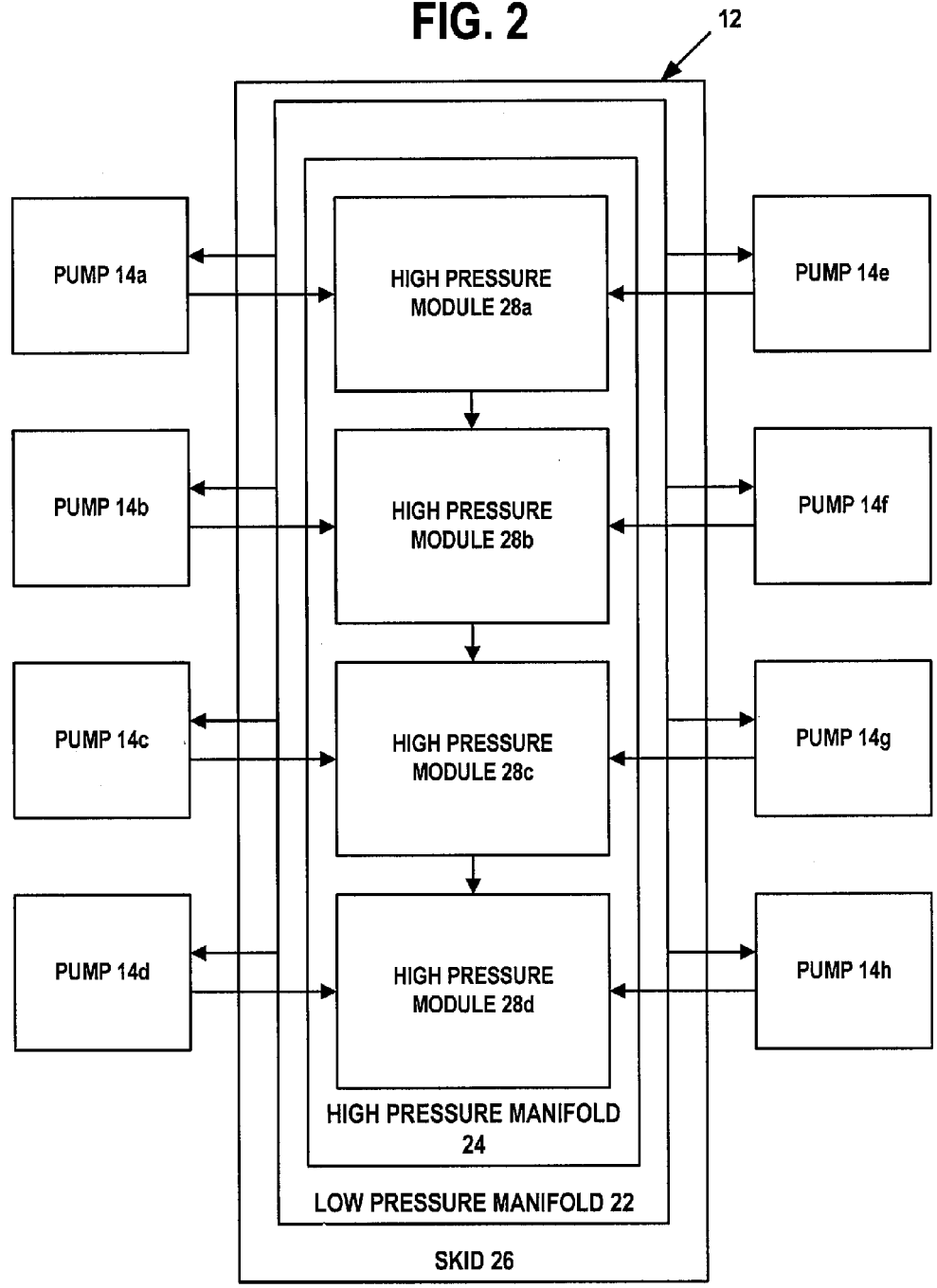
FIG. 2 is a diagrammatic view of the manifold assembly of FIG. 1 according to an exemplary embodiment, the manifold assembly including a skid, a low pressure manifold, and a high pressure manifold, the high pressure manifold including a plurality of high pressure modules.

In an exemplary embodiment, as illustrated in FIG. 2 with continuing reference to FIG. 1, the manifold assembly 12 includes a low pressure manifold 22 and a high pressure manifold 24, both of which are mounted on, and connected to, a skid 26. The high pressure manifold 24 includes high pressure modules 28a, 28b, 28c and 28d, all of which are in fluid communication with each other. Each of the pumps 14a and 14e is in fluid communication with each of the low pressure manifold 22 and the high pressure module 28a. Each of the pumps 14b and 14f is in fluid communication with each of the low pressure manifold 22 and the high pressure module 28b. Each of the pumps 14c and 14g is in fluid communication with each of the low pressure manifold 22 and the high pressure module 28c. Each of the pumps 14d and 14h is in fluid communication with each of the low pressure manifold 22 and the high pressure module 28d. In several exemplary embodiments, each of the pumps 14a-14h is, includes, or is part of, a positive displacement pump, a reciprocating pump assembly, a frac pump, a pump truck, a truck, a trailer, or any combination thereof.

Figure 3:
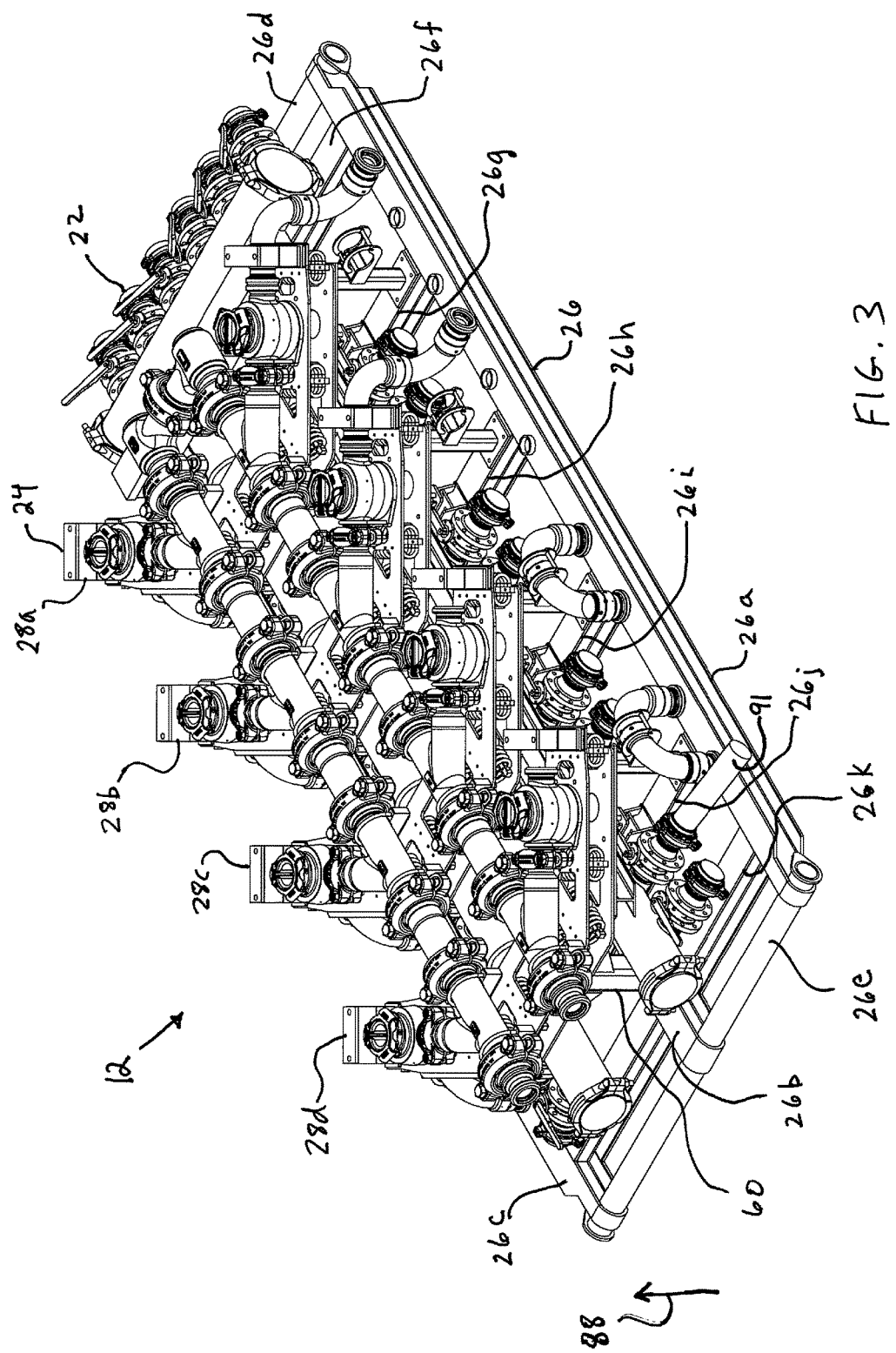
FIG. 3 is a perspective view of the manifold assembly of FIG. 2, according to an exemplary embodiment.
Figure 4:
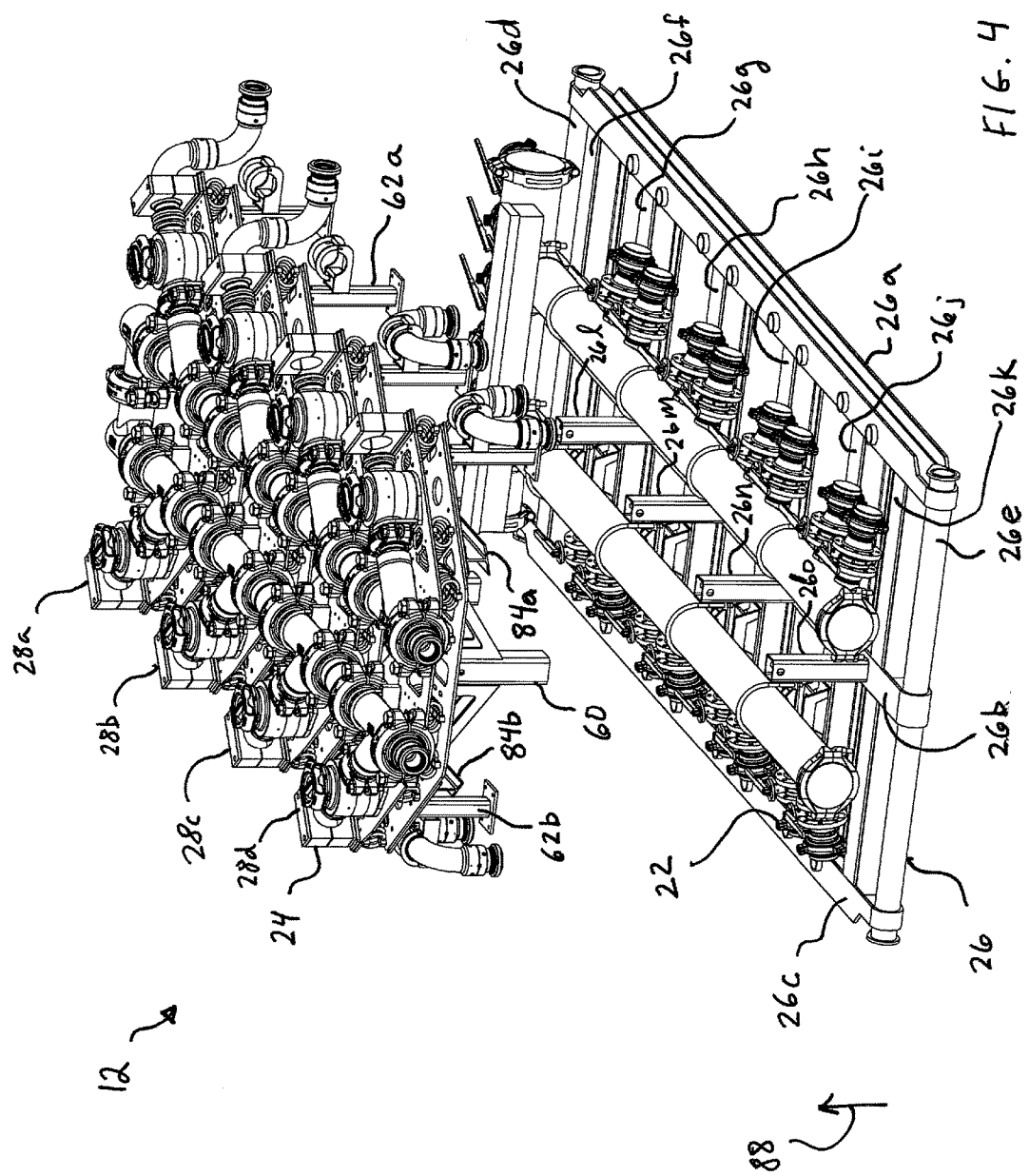
FIG. 4 is an exploded perspective view of the manifold assembly of FIG. 3, according to an exemplary embodiment.

In an exemplary embodiment, as illustrated in FIGS. 3 and 4 with continuing reference to FIGS. 1 and 2, the skid 26 includes longitudinally-extending structural members 26a, 26b and 26c, which are spaced in a parallel relation. Transversely-extending end members 26d and 26e are spaced in a parallel relation, and are respectively connected to opposing end portions of the longitudinally-extending structural members 26a, 26b and 26c. Transversely-extending structural members 26f, 26g, 26h, 26i, 26j and 26k extend between the longitudinally-extending structural members 26a and 26b, and also between the longitudinally-extending structural members 26b and 26c. Vertically-extending center posts 26l, 26m, 26n and 26o extend upwards from the longitudinally-extending structural member 26b.

Figure 5:
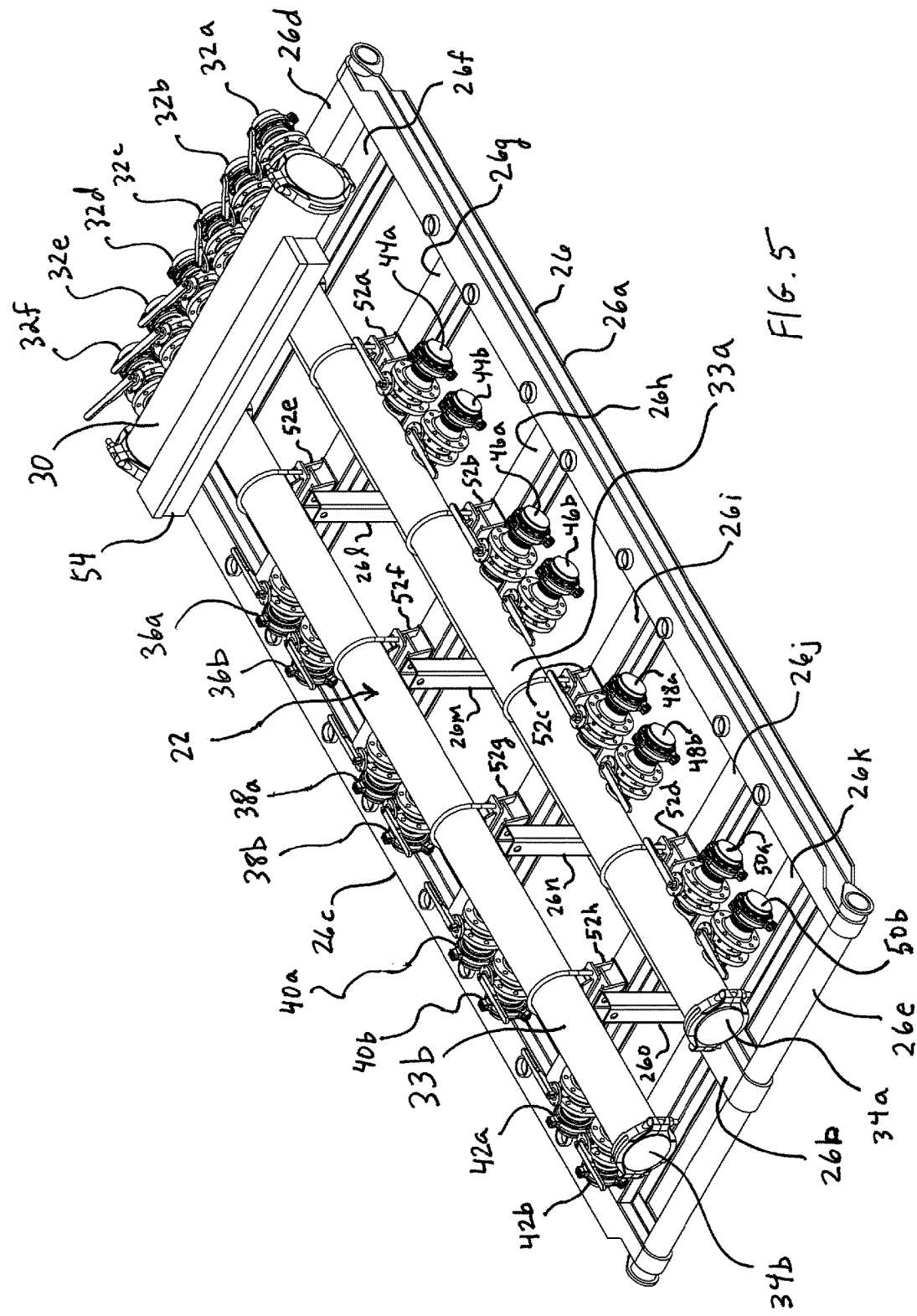
FIG. 5 is a perspective view of the skid and the low pressure manifold of the manifold assembly of FIG. 3, according to an exemplary embodiment.

In an exemplary embodiment, as illustrated in FIG. 5 with continuing reference to FIGS. 1-4, the low pressure manifold 22 includes a transversely-extending tubular member, or rear header 30, which is in fluid communication with the blender 16 via inlet ports 32a-32f. The inlet ports 32a-32f are connected to the rear header 30, and are positioned above the end member 26d. A bracket (not shown) to support the rear header 30 is disposed between the rear header 30 and the transversely-extending structural member 26f, and also between the longitudinally-extending structural members 26a and 26b. Another bracket (not shown) to support the rear header 30 is disposed between the rear header 30 and the transversely-extending structural member 26f, and also between the longitudinally-extending structural members 26b and 26c.

Longitudinally-extending tubular members, or flow lines 33a and 33b, are in fluid communication with the rear header 30, and extend therefrom in a direction towards the end member 26e. The flow lines 33a and 33b are spaced in a parallel relation, and include front end caps 34a and 34b, respectively, which are opposite the rear header 30.

The pumps 14a, 14b, 14c and 14d (not shown in FIG. 5) are in fluid communication with the flow line 33b via one of outlet ports 36a and 36b, one of outlet ports 38a and 38b, one of outlet ports 40a and 40b, and one of outlet ports 42a and 42b, respectively; such fluid communication may be effected with one or more hoses, piping, flowline components, other components, or any combination thereof. The outlet ports 36a, 36b, 38a, 38b, 40a, 40b, 42a and 42b are connected to the flow line 33b. In an exemplary embodiment, the pumps 14a, 14b, 14c and 14d (not shown in FIG. 5) are in fluid communication with the flow line 33b via both of the outlet ports 36a and 36b, both of the outlet ports 38a and 38b, both of the outlet ports 40a and 40b, and both of the outlet ports 42a and 42b, respectively; such fluid communication may be effected with one or more hoses, piping, flowline components, other components, or any combination thereof.

Similarly, the pumps 14e, 14f, 14g and 14h (not shown in FIG. 5) are in fluid communication with the flow line 33a via one of outlet ports 44a and 44b, one of outlet ports 46a and 46b, one of outlet ports 48a and 48b, and one of outlet ports 50a and 50b, respectively; such fluid communication may be effected with one or more hoses, piping, flowline components, or any combination thereof. The outlet ports 44a, 44b, 46a, 46b, 48a, 48b, 50a and 50b are connected to the flow line 33a. In an exemplary embodiment, the pumps 14e, 14f, 14g and 14h (not shown in FIG. 5) are in fluid communication with the flow line 33a via both of the outlet ports 44a and 44b, both of the outlet ports 46a and 46b, both of the outlet ports 48a and 48b, and both of the outlet ports 50a and 50b, respectively; such fluid communication may be effected with one or more hoses, piping, flowline components, or any combination thereof.

The flow line 33a is mounted to the skid 26 via low pressure mounts 52a, 52b, 52c, and 52d, which are connected to the transversely-extending structural members 26g, 26h, 26i and 26j, respectively. Similarly, the flow line 33b is mounted to the skid 26 via low pressure mounts 52e, 52f, 52g and 52h, which are connected to the transversely-extending structural members 26g, 26h, 26i and 26j, respectively. In an exemplary embodiment, the low pressure manifold 22 is connected to the skid 26 by lowering the low pressure manifold 22 down and then ensuring that respective upside-down-u-shaped brackets extend about the flow lines 33a and 33b and engage the low pressure mounts 52a-52h; the clamps are then connected to the low pressure mounts 52a-52h, thereby connecting the low pressure manifold 22 to the skid 26.

As shown in FIG. 5, the manifold assembly 12 may include an optional tool box 54, which may be mounted above and across the flow lines 33a and 33b. Alternatively, in an exemplary embodiment, the tool box 54 may be mounted on at least the longitudinally-extending structural member 26b so that it is positioned below the flow lines 33a and 33b (see FIGS. 8 and 9). In several exemplary embodiments, the tool box 54 may be omitted from the manifold assembly 12.

Figure 6:
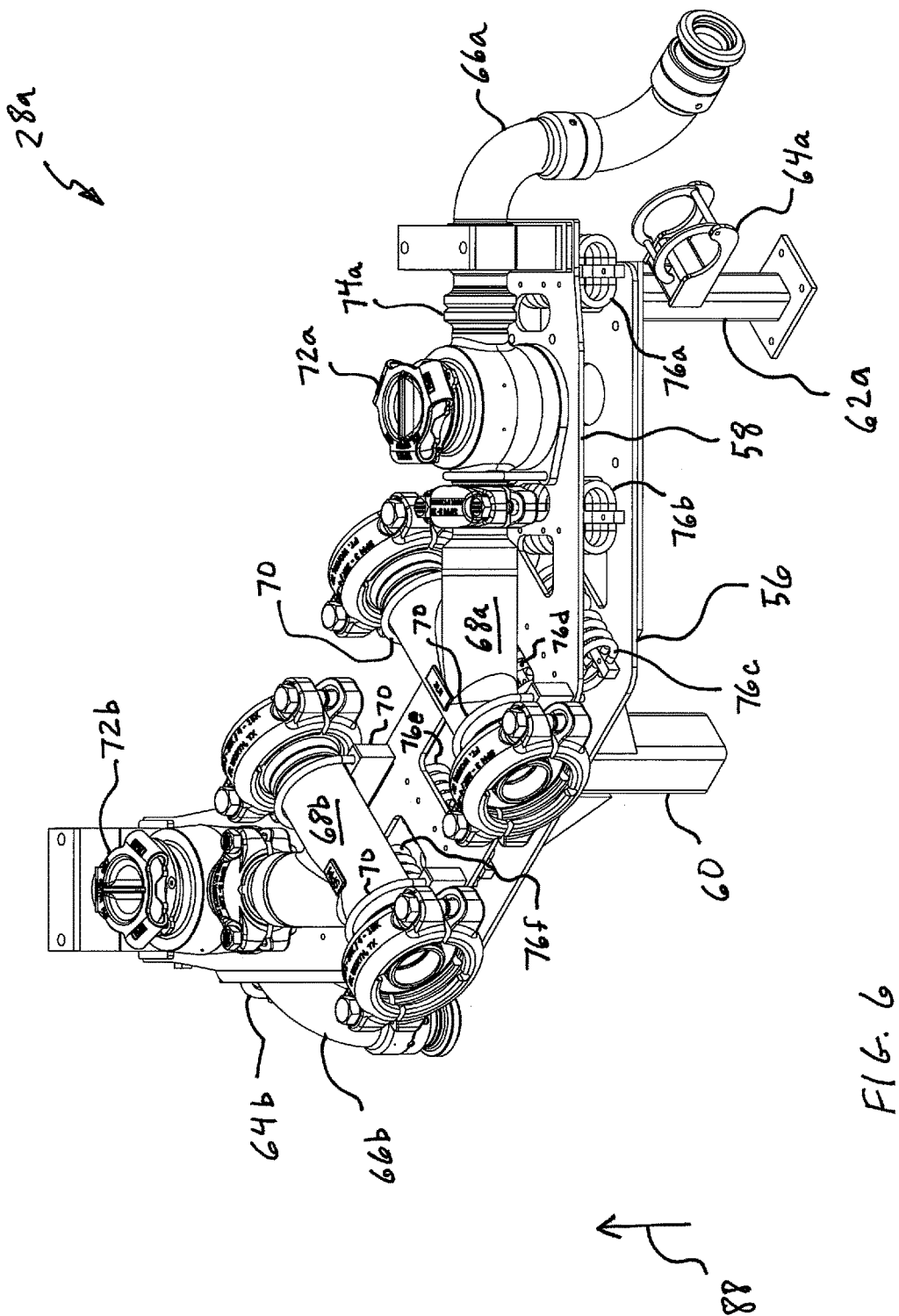
FIG. 6 is a perspective view of one of the high pressure modules of the manifold assembly of FIG. 3, according to an exemplary embodiment.

In an exemplary embodiment, as illustrated in FIG. 6 with continuing reference to FIGS. 1-5, the high pressure module 28a includes a lower wing mounting bracket 56 and an upper wing mounting bracket 58 vertically spaced therefrom in a parallel relation. In several exemplary embodiments, instead of having a wing shape, one or both of the mounting brackets 56 and 58 may have another shape, such as a rectangular, square, oval, or circular shape.

A center tubular post 60 extends vertically downward from about the center of the lower wing mounting bracket 56. A side tubular post 62a extends vertically downward from one side portion of the lower wing mounting bracket 56; a side tubular post 62b (shown in FIG. 9), which is identical to the side tubular post 62a, extends vertically downward from the other side portion of the lower wing mounting bracket 56. Carrier brackets 64a and 64b are connected to the side tubular posts 62a and 62b, respectively. Under conditions to be described below, the carrier brackets 64a and 64b are adapted to support swivels 66a and 66b, respectively, as needed or desired. As shown in FIG. 6, the swivel 66a is not supported by the carrier bracket 64a, but the swivel 66b is supported by the carrier bracket 64b.

Figure 8:
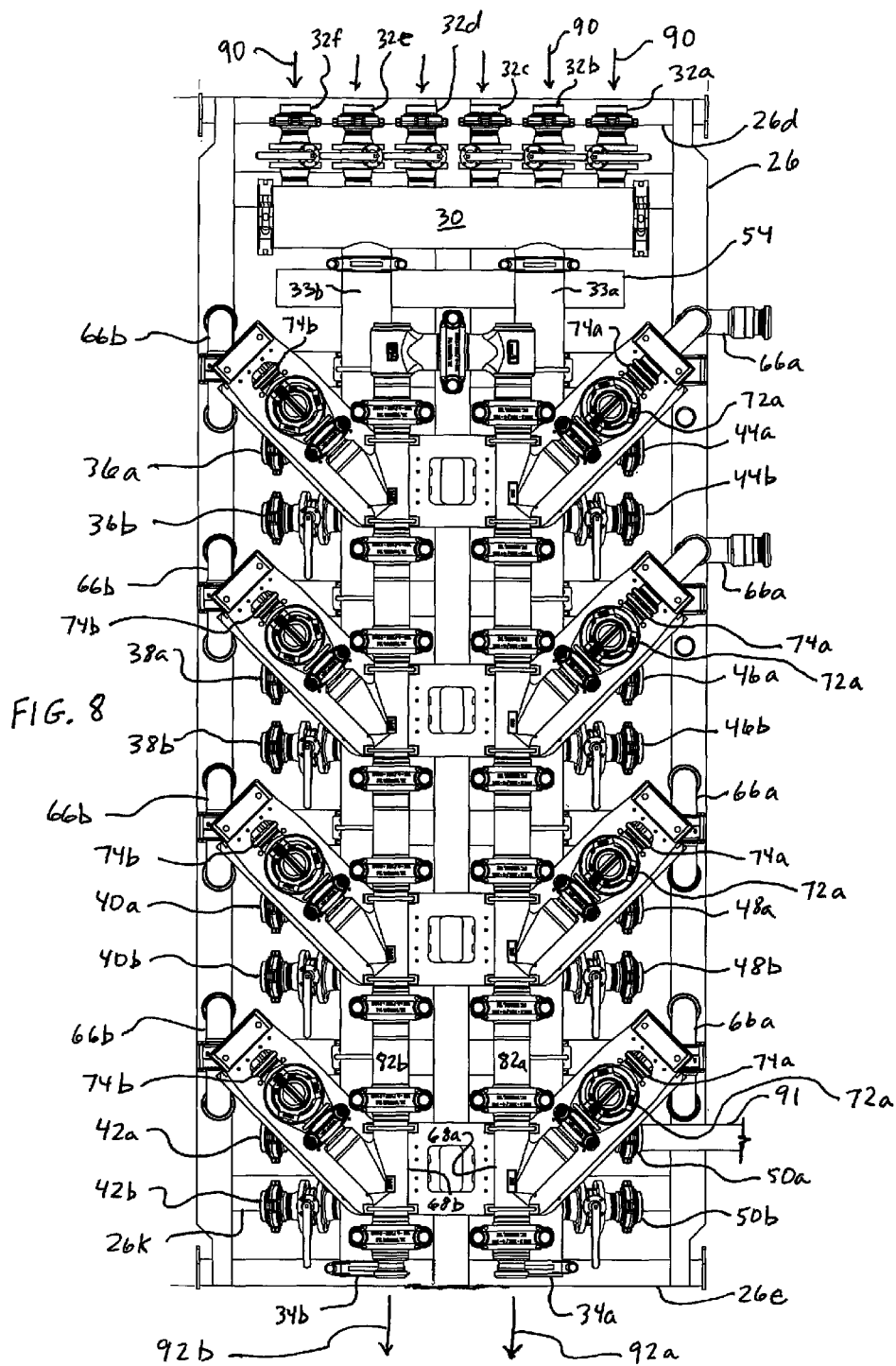
FIG. 8 is a top plan view of the manifold assembly of FIG. 3, according to an exemplary embodiment.

Lateral y-fittings 68a and 68b are connected to the upper wing mounting bracket 58. In an exemplary embodiment, as shown in FIG. 6, upside-down-u-shaped brackets 70 connect the lateral y-fittings 68a and 68b to the upper wing mounting bracket 58. Isolation valves 72a and 72b are connected to, and are in fluid communication with, the lateral y-fittings 68a and 68b, respectively. The isolation valves 72a and 72b are in fluid communication with ports 74a and 74b, which are adapted to be connected to, and in fluid communication with, the swivels 66a and 66b, respectively. The port 74b is shown in FIG. 8. The ports 74a and 74b are connected to the upper wing mounting bracket 58. The ports 74a and 74b are in fluid communication with the lateral y-fittings 68a and 68b, respectively. The port 74a, and thus the lateral y-fitting 68a in fluid communication therewith, are adapted to be in fluid communication with one of the pumps 14e, 14f, 14g, and 14h. The port 74b, and thus the lateral y-fitting 68b in fluid communication therewith, are adapted to be in fluid communication with one of the pumps 14a, 14b, 14c, and 14d. The lateral y-fittings 68a and 68b, the isolation valves 72a and 72b, and the ports 74a and 74b are mounted on the upper side of the upper wing mounting bracket 58.

In several exemplary embodiments, instead of being y-shaped, the fittings 68a and 68b may be t-shaped or cross-shaped, or may have other shapes. In several exemplary embodiments, the lateral y-fittings 68a and 68b are combined into one fitting, which may be cross-shaped or t-shaped, or may have other shapes; in several exemplary embodiments, such a combined fitting may be in fluid communication with each of the isolation valves 72a and 72b and thus with each of the ports 74a and 74b.

A plurality of vibration isolators 76 are connected to, and disposed between, the wing mounting brackets 56 and 58. The plurality of vibration isolators 76 are connected to the lower side of the upper wing mounting bracket 58 and the upper side of the lower wing mounting bracket 56. As shown in FIG. 6, a vibration isolator 76a is positioned above and proximate the side tubular post 62a, and below and proximate the isolation valve 72a and the port 74a. A vibration isolator 76b is positioned below and proximate the isolation valve 72a and, in particular, the connection between the lateral y-fitting 68a and the isolation valve 72a. Vibration isolators 76c and 76d are positioned below and proximate the lateral y-fitting 68a. Vibration isolators 76e and 76f are positioned below and proximate the lateral y-fitting 68b. A vibration isolator 76g (shown in FIG. 9) is positioned below and proximate the isolation valve 72b and, in particular, the connection between the lateral y-fitting 68b and the isolation valve 72b. A vibration isolator 76h (shown in FIG. 9) is positioned above and proximate the side tubular post 62b, and below and proximate the isolation valve 72b and the port 74b.

In an exemplary embodiment, each of the vibration isolators 76a, 76b, 76c, 76d, 76e, 76f, 76g and 76h is, includes, or is part of, one or more helical cable isolators. In an exemplary embodiment, each of the vibration isolators 76a, 76b, 76c, 76d, 76e, 76f, 76g and 76h is, includes, or is part of, one or more M Series helical cable isolators, one or more SM Series helical cable isolators, one or more SB Series helical cable isolators, or any combination thereof, all of which are commercially available from Isolation Dynamics Corp. (IDC), West Babylon, N.Y.

In an exemplary embodiment, instead of, or in addition to a helical cable isolator, each of the vibration isolators 76a, 76b, 76c, 76d, 76e, 76f, 76g and 76h is, includes, or is part of, one or more two-piece mounts. In an exemplary embodiment, instead of, or in addition to a helical cable isolator, each of the vibration isolators 76a, 76b, 76c, 76d, 76e, 76f, 76g and 76h is, includes, or is part of, one or more CBB Series two-piece mounts, one or more CBC Series two-piece mounts, one or more SSB Series two-piece mounts, one or more CB-2200 Series two-piece mounts, or any combination thereof, all of which are commercially available from LORD Corporation, Cary, N.C.

In an exemplary embodiment, the lower wing mounting bracket 56 includes two or more similarly-shaped and generally planar brackets or plates stacked on top of each other, all of which are connected together by, for example, fasteners. The lowermost bracket of the lower wing mounting bracket 56 is connected to the center tubular post 60 and the side tubular posts 62a and 62b, and the uppermost bracket of the lower wing mounting bracket 56 is connected to the vibration isolators 76a-76h; in an exemplary embodiment, the uppermost bracket to which the vibration isolators 76a-76h are connected is disconnected from at least the lowermost bracket to which the center tubular posts 60 and the side tubular posts 62a and 62b are connected, and thus at least the upper wing mounting bracket 58, the vibration isolators 76a-76h, and the uppermost bracket of the lower wing mounting bracket 56 can be easily disconnected from the high pressure manifold 24. Such an easy disconnection facilitates the inspection, repair, replacement, installation or other maintenance of, for example, one or more of the vibration isolators 76a-76h.

In an exemplary embodiment, each of the high pressure modules 28b, 28c and 28d are identical to the high pressure module 28a and therefore will not be described in further detail. Components of each of the high pressure modules 28b, 28c and 28d that are identical to corresponding components of the high pressure module 28a will be given the same reference numerals as that of the high pressure module 28a.

Figure 7:
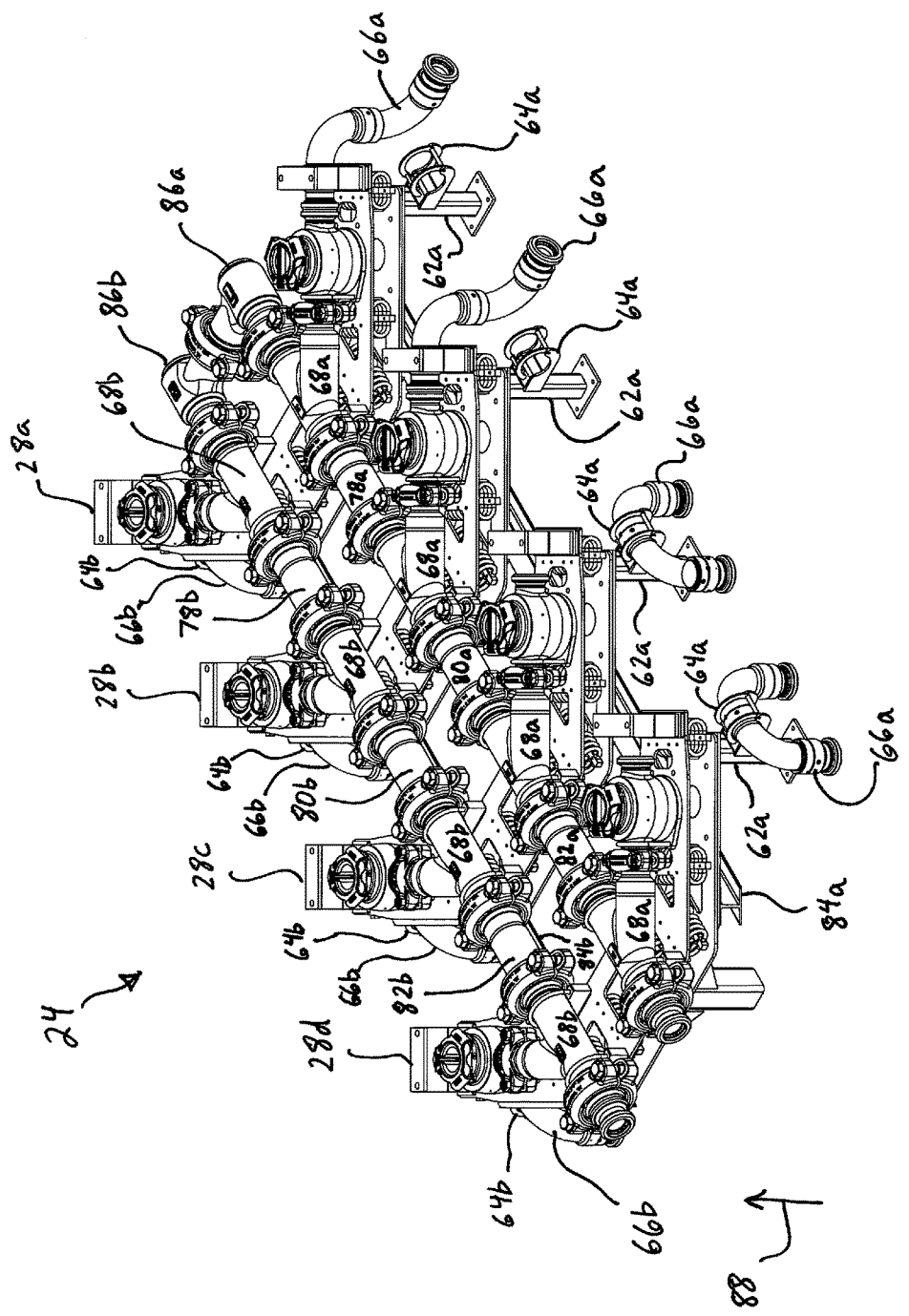
FIG. 7 is a perspective view of the high pressure manifold of the manifold assembly of FIG. 3, according to another exemplary embodiment.

In an exemplary embodiment, as illustrated in FIG. 7 with continuing reference to FIGS. 1-6, when the high pressure manifold 24 is in its assembled configuration, the high pressure module 28a is connected to the high pressure model 28b, the high pressure module 28b is connected to the high pressure module 28c, and the high pressure module 28c is connected to the high pressure module 28d. All of the high pressure modules 28a, 28b, 28c and 28d are in fluid communication with each other.

Figure 9:
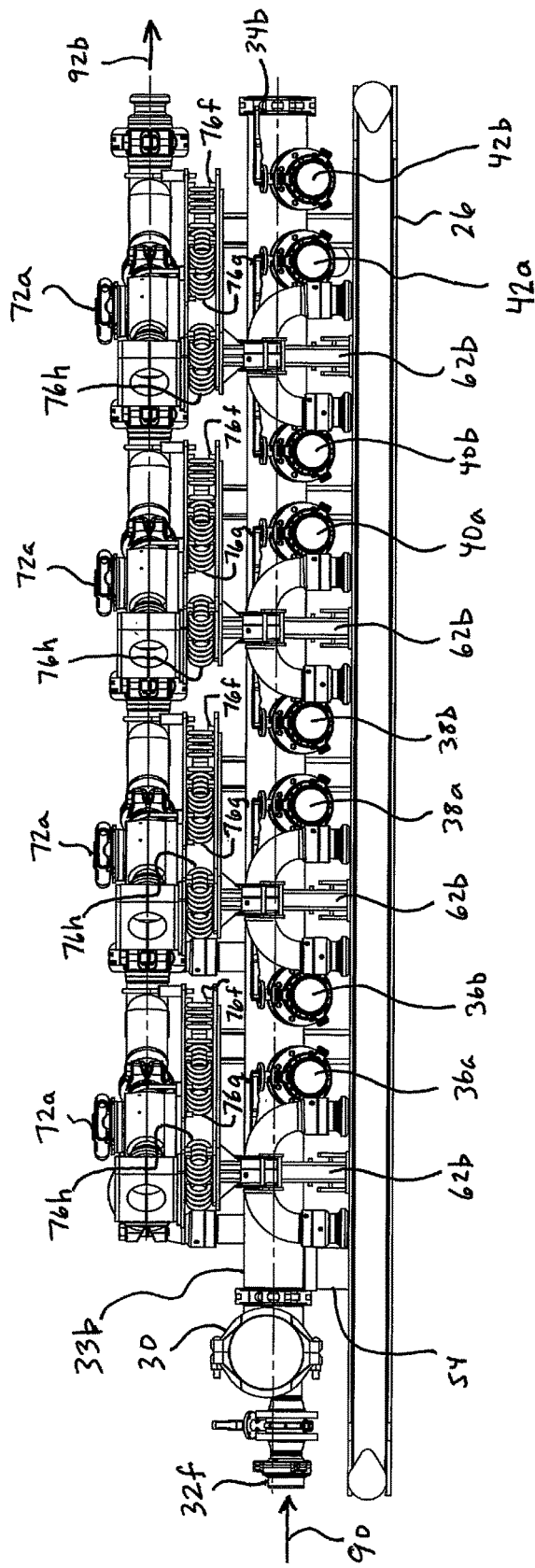
FIG. 9 is an elevational view of the manifold assembly of FIG. 3, according to an exemplary embodiment.

More particularly, the high pressure module 28a is connected to the high pressure module 28b via straight fittings 78a and 78b. The straight fitting 78a extends between the respective lateral y-fittings 68a of the high pressure modules 28a and 28b. Likewise, the straight fitting 78b extends between the respective lateral y-fittings 68b of the high pressure modules 28a and 28b. The high pressure module 28b is connected to the high pressure module 28c via straight fittings 80a and 80b. The straight fitting 80a extends between the respective lateral y-fittings 68a of the high pressure modules 28b and 28c. Likewise, the straight fitting 80b extends between the respective lateral y-fittings 68b of the high pressure modules 28b and 28c. The high pressure module 28c is connected to the high pressure module 28d via straight fittings 82a and 82b. The straight fitting 82a extends between the respective lateral y-fittings 68a of the high pressure modules 28c and 28d. Likewise, the straight fitting 82b extends between the respective lateral y-fittings 68b of the high pressure modules 28c and 28d. Moreover, in an exemplary embodiment, in addition to the foregoing connections, parallel-spaced and longitudinally-extending supports 84a and 84b are connected to the respective lower wing mounting brackets 56 of the high pressure modules 28a, 28b, 28c and 28d, thereby providing additional points of connection between the high pressure modules 28a and 28b, between the high pressure modules 28b and 28c, and between the high pressure modules 28c and 28d. In several exemplary embodiments, the supports 84a and 84b may be omitted, as shown in FIGS. 8 and 9.

As shown in FIG. 7, when the high pressure manifold 24 is in its assembled configuration, a right-angle fitting 86a is connected to the lateral y-fitting 68a of the high pressure module 28a at the end thereof opposite the end at which the straight fitting 78a is connected. A right-angle fitting 86b is connected to the lateral y-fitting 68b of the high pressure module 28a at the end thereof opposite the end at which the straight fitting 78b is connected. The right-angle fittings 86a and 86b are connected together so that the lateral y-fittings 68a and 68b of the high pressure module 28a are in fluid communication with each other.

The lateral y-fittings 68a and 68b of the high pressure module 28d are adapted to be in fluid communication with the wellhead 18; such fluid communication may be effected with one or more hoses, piping, flowline components, other components, or any combination thereof.

Each of the respective carrier brackets 64a of the high pressure modules 28a-28d is adapted to support the corresponding swivel 66a, as needed or desired. And each of the respective carrier brackets 64b of the high pressure modules 28a-28d is adapted to support the corresponding swivel 66b, as needed or desired. As shown in FIG. 7, the respective swivels 66a of the high pressure modules 28c and 28d are supported by the corresponding carrier brackets 64a. The respective swivels 66a of the high pressure modules 28a and 28b are connected to the corresponding ports 74a. The respective swivels 66b of the high pressure modules 28a-28d are supported by the corresponding carrier brackets 64b. In several exemplary embodiments, one or more of the respective swivels 66a and 66b may be supported in accordance with the foregoing during the transportation, installation, adjustment, or other movement of the high pressure manifold 24. In several exemplary embodiments, one or more of the respective swivels 66a and 66b may be supported in accordance with the foregoing when the corresponding high pressure module 28a-28d is not in use.

In an exemplary embodiment, with continuing reference to FIGS. 1-7, when the manifold assembly 12 is in its assembled condition as shown in FIGS. 1-3, the low pressure manifold 22 is connected to the skid 26 as discussed above, and the high pressure manifold 24 is connected to the skid 26. In particular, as shown in FIG. 3, when the high pressure manifold 24 is connected to the skid 26, the vertically-extending center posts 26l-26o are received by and thus extend up into, and are connected to, the respective center tubular posts 60 of the high pressure modules 28a-28d. The respective side tubular posts 62a and 62b of the high pressure modules 28a-28d are connected to respective ones of the transversely-extending structural members 26f, 26g, 26h, 26i, 26j and 26k. Due to the respective combinations of the center tubular post 60 and the side tubular posts 62a and 62b of each of the high pressure modules 28a-28d, the majority of the high pressure manifold 24 is disposed above the low pressure manifold 22, except for the respective center tubular posts 60, the respective side tubular posts 62a and 62b, the respective carrier brackets 64a and 64b, and the respective swivels 66a and 66b of the high pressure modules 28a-28d. Except for the respective swivels 66a and 66b, all components of the high pressure manifold 24 through which fluid is adapted to flow (as will be described in further detail below) are vertically offset from, and disposed above, the low pressure manifold 22 and the skid 26. This vertical offset, as indicated by arrow 88 in FIG. 3, facilitates assembly and maintenance of the high pressure manifold 24, providing better serviceability and a more ergonomically correct design for personnel. This vertical offset indicated by the arrow 88, and the serviceability and ergonomically beneficial aspects that flow therefrom, are present when: the manifold assembly 12 is in its assembled condition as shown in FIG. 3; the high pressure manifold 24 is disconnected in whole from the remainder of the manifold assembly 12 (including the low pressure manifold 22 and the skid 26) and engages or rests on another horizontal surface, such as the ground, as shown in FIGS. 4 and 7; and the high pressure manifold 24 is disconnected in part from the remainder of the manifold assembly 12 (i.e., one or more of the high pressure modules 28a-28d is or are removed from the remainder of the manifold assembly 12) and rest(s) on another horizontal surface, such as the ground, as shown in FIG. 6.

In several exemplary embodiments, the vertical offset indicated by the arrow 88 may be adjustable by providing different locations along each of the center tubular posts 60 at which the center tubular posts 60 may be pinned or otherwise fastened to the respective vertically-extending center posts 26l-26o, and/or by providing different locations along each of the vertically-extending center posts 26l-26o at which the respective center tubular posts 60 may be pinned or otherwise fastened. Moreover, in several exemplary embodiments, the side tubular posts 62a and 62b may include respective sets of telescoping members to further provide adjustability to the vertical offset indicated by the arrow 88. Moreover, side posts may be connected to the skid 26; these side posts may be received by and thus extend up into, and be connected to, respective ones of the side tubular posts 62a and 62b; the respective locations of these connections may be adjustable to provide adjustability of the vertical offset indicated by the arrow 88.

In several exemplary embodiments, due to the modular configuration of the high pressure manifold 24 of the manifold assembly 12, the manifold assembly 12 may be assembled in different manners. For example, in one embodiment, the low pressure manifold 22 may be connected to the skid 26, and the high pressure manifold 24 may be connected (or reconnected) in whole to the skid 26. In another exemplary embodiment, the low pressure manifold 22 may be connected to the skid 26, and the high pressure manifold 24 may be connected (or reconnected) in part to the skid 26 by connecting one or more of the high pressure modules 28a-28d to the skid 26, and connecting one or more other of the high pressure modules 28a-28d to the skid 26.

In operation, in an exemplary embodiment, as illustrated in FIGS. 8 and 9 with continuing reference to FIGS. 1-7, the system 10 is used to hydraulically fracture (or "frac") a subterranean formation, thereby facilitating oil and gas exploration and production operations. The wellhead 18 may be the surface termination of a wellbore (not shown) that traverses such a subterranean formation. The system 10 operates to inject fluid under high pressure into the wellbore of which the wellhead 18 is the surface termination.

More particularly, fluid flows from the fluid source(s) 20 to the blender 16. In the blender 16, the fluid supplied from the fluid source(s) 20 is mixed with proppant, sand, other materials such as additives, or any combination thereof. As indicated by arrows 90 in FIGS. 8 and 9, the mixed fluid then flows from the blender 16 and into the rear header 30 of the low pressure manifold 22 via the inlet ports 32a-32f. A portion of the mixed fluid flows from the rear header 30 and into the flow line 33b, and then to the pumps 14a, 14b, 14c and 14d via at least one of outlet ports 36a and 36b, at least one of outlet ports 38a and 38b, at least one of outlet ports 40a and 40b, and at least one of outlet ports 42a and 42b, respectively. Another portion of the mixed fluid flows from the rear header 30 and into the flow line 33a, and then to the pumps 14e, 14f, 14g and 14h via at least one of outlet ports 44a and 44b, at least one of outlet ports 46a and 46b, at least one of outlet ports 48a and 48b, and at least one of outlet ports 50a and 50b, respectively. Fluid flows from the foregoing outlet ports to the respective pumps 14a-14h via one or more hoses, piping, flowline components, other components, or any combination thereof; an example of such a hose is a hose 91, a portion of which is shown to be connected to the outlet port 50a in FIGS. 3 and 8.

The pumps 14a-14d pressurize the fluid flowing therethrough, pumping the fluid into the high pressure manifold 24 via the respective swivels 66b. Likewise, the pumps 14e-14h pressurize the fluid flowing therethrough, pumping the fluid into the high pressure manifold 24 via the respective swivels 66a. Although in FIGS. 8 and 9 not all of the swivels 66a and 66b are shown as respectively connected to the corresponding ports 74a and 74b, it is understood that, during the operation of all of the pumps 14a-14h, all of the swivels 66a and 66b are respectively connected to the corresponding ports 74a and 74b.

Respective portions of the pressurized fluid flow through the respective ports 74a and 74b, the isolation valves 72a and 72b, and lateral y-fittings 68a and 68b, of the high pressure modules 28a-28d. Some portions of the pressurized fluid flow through one or more of the respective lateral y-fittings 68a and 68b, the right-angle fittings 86a and 86b, and the straight fittings 78a, 78b, 80a, 80b, 82a and 82b. All of the pressurized fluid generally flows in the direction indicated by arrows 92a and 92b, and out either of the respective ends of the lateral y-fittings 68a and 68b located opposite the straight fittings 82a and 82b. The pressurized fluid ultimately exits the high pressure manifold 24. After exiting the high pressure manifold 24, the pressurized fluid flows towards the wellhead 18, and is injected under high pressure into the wellbore of which the wellhead 18 is the surface termination.

Before, during and after the above-described operation of the system 10, in several exemplary embodiments, the respective sets of vibration isolators 76a-76h dampen dynamic loading by, for example, isolating vibration and/or absorbing shock. In an exemplary embodiment, the respective sets of vibration isolators 76a-76h dampen dynamic loading experienced by the great majority of the high pressure manifold 24 including, for example, the lateral y-fittings 68a and 68b, the straight fittings 82a and 82b, etc. This dynamic loading may be caused by, for example, the operation of the pumps 14a-14h. For another example, this dynamic loading may be caused by the operation of the blender 16. This dynamic loading may be caused by a wide variety of factors, or combinations thereof. In several exemplary embodiments, the vibration isolators 76a-76h dampen the dynamics that occur during the above-described operation of the system 10.

In several exemplary embodiments, with continuing reference to FIGS. 1-9, the manifold assembly 12 may be disassembled for repair and maintenance, and/or replacement of one or more components, and then reassembled. In several exemplary embodiments, due to the modular configuration of the high pressure manifold 24 of the manifold assembly 12, the manifold assembly 12 may be disassembled and reassembled in different manners. For example, in one embodiment, the high pressure manifold 24 may be disconnected in whole from the remainder of the manifold assembly 12 by disconnecting the center tubular posts 60 and the side tubular posts 62a and 62b from the skid 26, and moving in whole the plurality of high pressure modules 28a-28d relative to the skid 26 (e.g., lifting in whole the plurality of high pressure modules 28a-28d up and off of the skid 26, and/or sliding in whole the plurality of high pressure modules 28a-28d off of the skid 26). The high pressure manifold 24 may then be reconnected in whole to the remainder of the manifold assembly 12 by moving (lowering, sliding, etc.) in whole the plurality of high pressure modules 28a-28d relative to and towards the skid 26, and reconnecting the posts 60, 62a and 62b to the skid 26. In another exemplary embodiment, the high pressure manifold 24 may be disconnected in part from the remainder of the manifold assembly 12 by disconnecting one or more of the high pressure modules 28a-28d. In several exemplary embodiments, such a disconnect may be made by disconnecting the center tubular post 60 and the side tubular posts 62a and 62b of the one of the high pressure modules 28a-28d to be removed from the skid 26, disconnecting the corresponding lateral y-fittings 68a and 68b from: the right-angle fittings 86a and 86b and the straight fittings 78a and 78b, from the straight fittings 78a and 78b and the straight fittings 80a and 80b, from the straight fittings 80a and 80b and the straight fittings 82a and 82b, or from the straight fittings 82a and 82b. In several exemplary embodiments, each pair of the straight fittings 78a and 78b, 80a and 80b, and 82a and 82b may be considered to be part of at least one of the high pressure modules 28a-28d and thus remains connected to the at least one of the pressures modules 28a-28d when the module is removed from the remainder of the manifold assembly 12. In several exemplary embodiments, the right-angle fittings 86a and 86b may be considered to be part of the high pressure module 28a and thus remain connected thereto when the high pressure module 28a is removed from the remainder of the manifold assembly 12. As discussed above, the vertical offset indicated by the arrow 88, and the serviceability and ergonomically beneficial aspects that flow therefrom, are present when: the high pressure manifold 24 is disconnected in whole from the remainder of the manifold assembly 12 (including the low pressure manifold 22 and the skid 26) and engages or rests on another horizontal surface, such as the ground, as shown in FIGS. 4 and 7; and the high pressure manifold 24 is disconnected in part from the remainder of the manifold assembly 12 (i.e., one or more of the high pressure modules 28a-28d is or are removed from the remainder of the manifold assembly 12) and rest(s) on another horizontal surface, such as the ground, as shown in FIG. 6. The one of the high pressure modules 28a-28d may then be moved (lifted, slid, etc.) relative to the skid 26 to complete the disconnection in part. The high pressure manifold 24 may then be reconnected in part to the remainder of the manifold assembly 12 by moving, relative to the skid 26, one or more of the high pressure modules 28a-28d and reconnecting the one or more of the high pressure modules 28a-28d to the skid 26. In several exemplary embodiments, such a reconnect may be made by reconnecting the center tubular post 60 and the side tubular posts 62a and 62b of the one of the high pressure modules 28a-28d to be reconnected to the skid 26, and reconnecting the corresponding lateral y-fittings 68a and 68b to: the right-angle fittings 86a and 86b and the straight fittings 78a and 78b; the straight fittings 78a and 78b and the straight fittings 80a and 80b; the straight fittings 80a and 80b and the straight fittings 82a and 82b; or the straight fittings 82a and 82b. In one embodiment, each of the high pressure modules 28a-28d, at least the corresponding mounting brackets 56 and 58, the lateral y-fittings 68a and 68b, the isolation valves 72a and 72b, the ports 74a and 74b, the plurality of vibration isolators 76, and the posts 60, 62a, and 62b, are all disconnectable together from, and all reconnectable together to, the skid 26.

In several exemplary embodiments, the high pressure manifold 24 of the manifold assembly 10 can be lifted in whole off of the skid 26 and set to the side of the skid 26, and then can be disassembled, repaired, maintained, assembled, have one or more components thereof replaced, or any combination thereof.

In several exemplary embodiments, any of the high pressure modules 28a-28d can be removed from the manifold assembly 12 and then repaired or replaced with another module that is substantially similar to the removed one of the high pressure modules 28a-28d.

In several exemplary embodiments, one or more of the high pressure modules 28a-28d may be removed from the high pressure manifold 24. In several exemplary embodiments, one or more high pressure modules, each of which is substantially identical to any one of the high pressure modules 28a-28d, may be added to the high pressure manifold 24. In several exemplary embodiments, one or more of the outlet ports 36a, 36b, 38a, 38b, 40a, 40b, 42a, 42b, 44a, 44b, 46a, 46b, 48a, 48b, 50a and 50b may be removed from the low pressure manifold 22. In several exemplary embodiments, one or more outlet ports, each of which is substantially identical to any one of the outlet ports 36a, 36b, 38a, 38b, 40a, 40b, 42a, 42b, 44a, 44b, 46a, 46b, 48a, 48b, 50a and 50b, may be added to the low pressure manifold 22.

Figure 10:
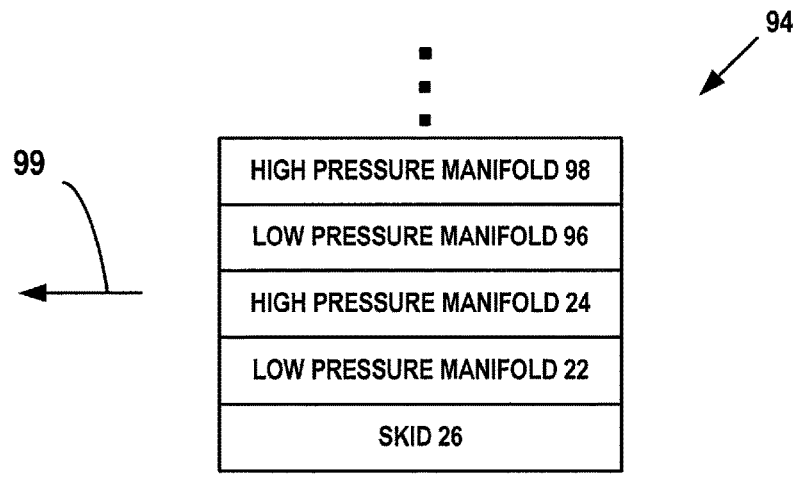
FIGS. 10, 11, 12 and 13 are diagrammatic views of manifold assemblies, according to respective exemplary embodiments.

In an exemplary embodiment, as illustrated in FIG. 10 with continuing reference to FIGS. 1-9, a manifold is generally referred to by the reference numeral 94 and includes the skid 26, the low pressure manifold 22, and the high pressure manifold 24. In several exemplary embodiments, each of the low pressure manifold 22 and the high pressure manifold 24 is connected to the skid 26 in the manifold assembly 94 in the same manner in which it is connected to the skid 26 in the manifold assembly 12. The manifold assembly 94 further includes a low pressure manifold 96 and a high pressure manifold 98. In an exemplary embodiment, the low pressure manifold 96 is substantially similar to the low pressure manifold 22, and is connected to the skid 26 in a manner similar to the manner in which the low pressure manifold 22 is connected to the skid 26 in the manifold assembly 12. In an exemplary embodiment, the low pressure manifold 96 is substantially similar to the low pressure manifold 22, and is connected to one or more of the high pressure manifold 24, the low pressure manifold 22, and the skid 26. In an exemplary embodiment, the high pressure manifold 98 is substantially similar to the high pressure manifold 24, and is connected to the skid 26 in a manner similar to the manner in which the high pressure manifold 24 is connected to the skid 26 in the manifold assembly 12. In an exemplary embodiment, the high pressure manifold 98 is substantially similar to the high pressure manifold 24, and is connected to one or more of the low pressure manifold 96, the high pressure manifold 24, the low pressure manifold 22, and the skid 26. In an exemplary embodiment: the low pressure manifold 96 is substantially similar to the low pressure manifold 22; the low pressure manifold 96 is mounted to a skid (not shown) that is substantially similar to the skid 26; the similar skid is connected to the skid 26 using vertically-extending supports; the high pressure manifold 98 is substantially similar to the high pressure manifold 24; and the high pressure manifold 98 is connected to the similar skid.

In several exemplary embodiments, the manifold assembly 94 may include one or more pairs of manifolds, each of which is disposed above the high pressure manifold 98 and includes a high pressure manifold disposed above a low pressure manifold; in an exemplary embodiment, each pair of manifolds includes a high pressure manifold that is substantially similar to the high pressure manifold 24 and is disposed above a low pressure manifold that is substantially similar to the low pressure manifold 22.

In several exemplary embodiments, the operation of the manifold assembly 94 is similar to the operation of the manifold assembly 12, with the drilling fluid flowing towards the wellhead 18 in a direction indicated by arrow 99.

Figure 11:
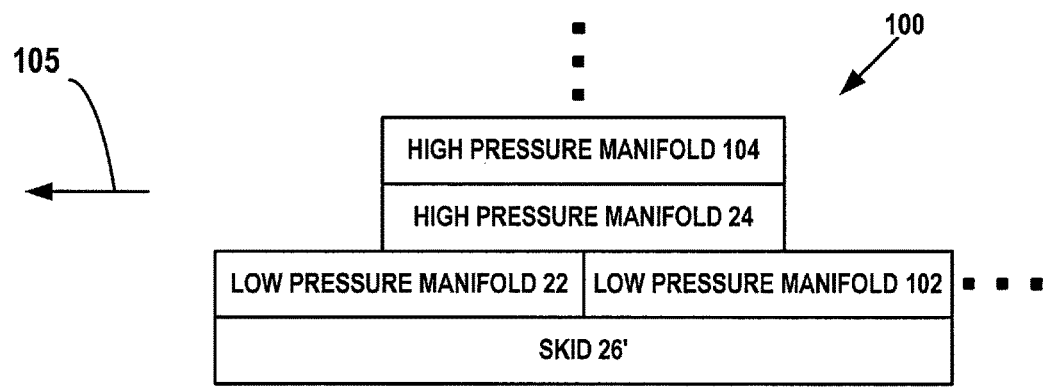

In an exemplary embodiment, as illustrated in FIG. 11 with continuing reference to FIGS. 1-10, a manifold assembly is generally referred to by the reference numeral 100 and includes a skid 26', the low pressure manifold 22, the high pressure manifold 24, a low pressure manifold 102, and a high pressure manifold 104. In an exemplary embodiment, the skid 26' includes the skid 26. In an exemplary embodiment, the skid 26' includes the skid 26 and another skid connected to one end portion thereof, the other skid being similar to the skid 26. In an exemplary embodiment, the skid 26' is similar to the skid 26, but is two times the size, lengthwise, of the skid 26. In an exemplary embodiment: the low pressure manifold 102 is substantially similar to, generally coplanar with, and connected to one end portion of, the low pressure manifold 22; the low pressure manifolds 22 and 102 are connected to the skid 26'; the high pressure manifold 24 is connected to the skid 26' and disposed above the low pressure manifolds 22 and 102; the high pressure manifold 104 is substantially similar to the high pressure manifold 24; and the high pressure manifold 104 is connected to the skid 26' and disposed above the high pressure manifold 24.

In several exemplary embodiments, the manifold assembly 100 includes one or more additional low pressure manifolds, each of which is substantially similar to, and generally coplanar with, the low pressure manifold 22, and further includes one or more additional high pressure manifolds, each of which is substantially similar to the high pressure manifold 24 and is disposed above the high pressure manifold 104.

In several exemplary embodiments, the operation of the manifold assembly 100 is similar to the operation of the manifold assembly 12, with the drilling fluid flowing towards the wellhead 18 in a direction indicated by arrow 105.

Figure 12:
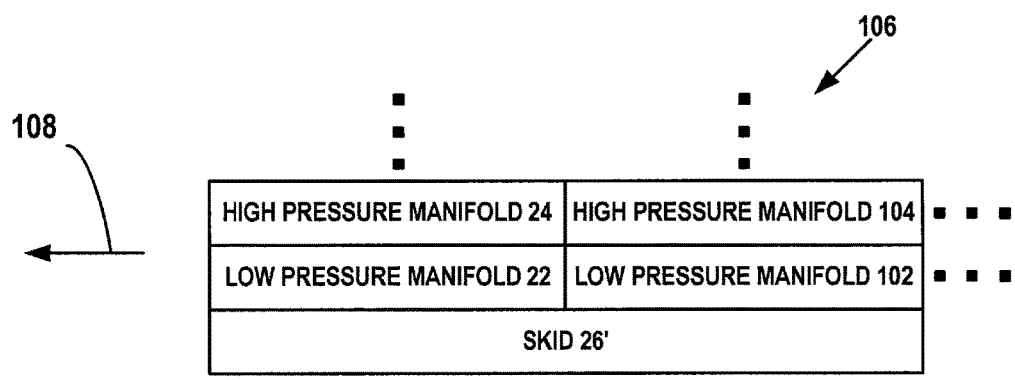

In an exemplary embodiment, as illustrated in FIG. 12 with continuing reference to FIGS. 1-11, a manifold assembly is generally referred to by the reference numeral 106 and includes the skid 26'. The manifold assembly 106 further includes the low pressure manifold 22, the high pressure manifold 24, the low pressure manifold 102, and the high pressure manifold 104, each of which is connected to the skid 26'. The high pressure manifold 24 is disposed above the low pressure manifold 22. The low pressure manifold 102 is coplanar with, and connected to one end portion of, the low pressure manifold 22. The high pressure manifold 104 is disposed above the low pressure manifold 102. The high pressure manifold 104 is coplanar with, and connected to one end portion of, the high pressure manifold 24.

In several exemplary embodiments, the manifold assembly 106 may include one or more pairs of manifolds, each of which includes a low pressure manifold that is: substantially similar to the low pressure manifold 22, connected to the skid 26', and coplanar with the low pressure manifolds 22 and 102; each of the one or more pairs of manifolds further includes a high pressure manifold that is: substantially similar to the high pressure manifold 22, connected to the skid 26', and coplanar with the high pressure manifolds 24 and 104.

In several exemplary embodiments, the operation of the manifold assembly 106 is similar to the operation of the manifold assembly 12, with the drilling fluid flowing towards the wellhead 18 in a direction indicated by arrow 108.

Figure 13:
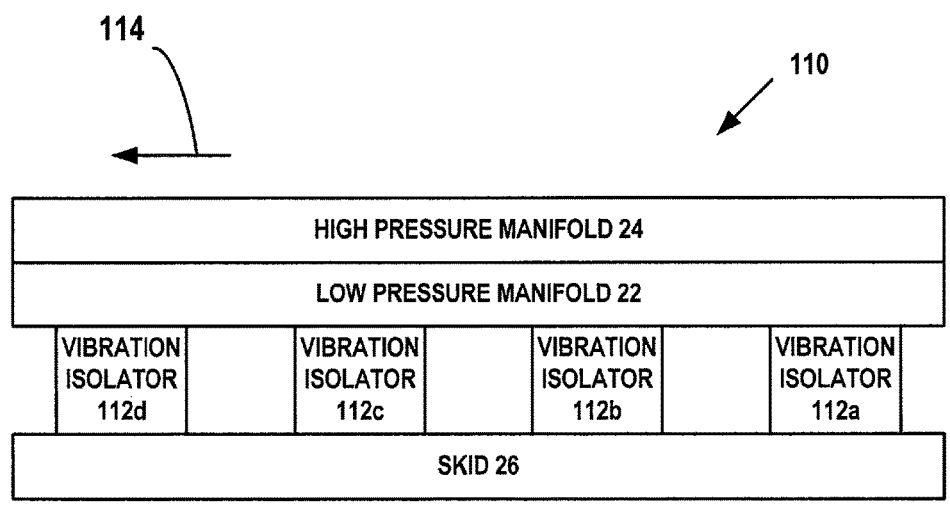

In an exemplary embodiment, as illustrated in FIG. 13 with continuing reference to FIGS. 1-12, a manifold assembly is generally referred to by the reference numeral 110 and includes the skid 26, the low pressure manifold 22, and the high pressure manifold 24. The high pressure manifold 24 is connected to the skid 26 in the manifold assembly 110 in a manner similar to the manner in which the high pressure manifold 24 is connected to the skid 26 in the manifold assembly 12. The manifold assembly 110 further includes vibration isolators 112a, 112b, 112c and 112d, which are disposed between the low pressure manifold 22 and the skid 26.

In several exemplary embodiments, each of the vibration isolators 112a-112d includes one or more vibration isolators, each of which is identical, or at least similar, to one of the vibration isolators 76a-76h. In several exemplary embodiments, each of the vibration isolators 112a-112d includes one or more vibration isolators, each of which is identical, or at least similar, to one of the vibration isolators 76a-76h, and each of the vibration isolators 112a-112d also includes lower and upper mounting brackets between which the one or more vibration isolators are disposed and to which the one or more vibration isolators are connected; the lower and upper mounting brackets may be identical, or at least similar, to the wing mounting brackets 56 and 58, respectively, with at least a portion of the high pressure manifold 24 being connected to the upper mounting bracket and the lower mounting bracket being connected to the skid 26.

In several exemplary embodiments, the operation of the manifold assembly 110 is similar to the operation of the manifold assembly 12, with the drilling fluid flowing towards the wellhead 18 in a direction indicated by arrow 114. Before, during and after the operation of the manifold assembly 110, in several exemplary embodiments, the vibration isolators 112a-112d dampen dynamic loading by, for example, isolating vibration and/or absorbing shock. In an exemplary embodiment, the vibration isolators 112a-112d dampen dynamic loading experienced by the great majority of the low pressure manifold 22 including, for example, the flow lines 33a and 33b. This dynamic loading may be caused by, for example, the operation of the pumps 14a-14h. For another example, this dynamic loading may be caused by the operation of the blender 16. This dynamic loading may be caused by a wide variety of factors, or combinations thereof. In several exemplary embodiments, the vibration isolators 112a-112d dampen the dynamics that occur during the operation of the manifold assembly 110.

Figure 14:
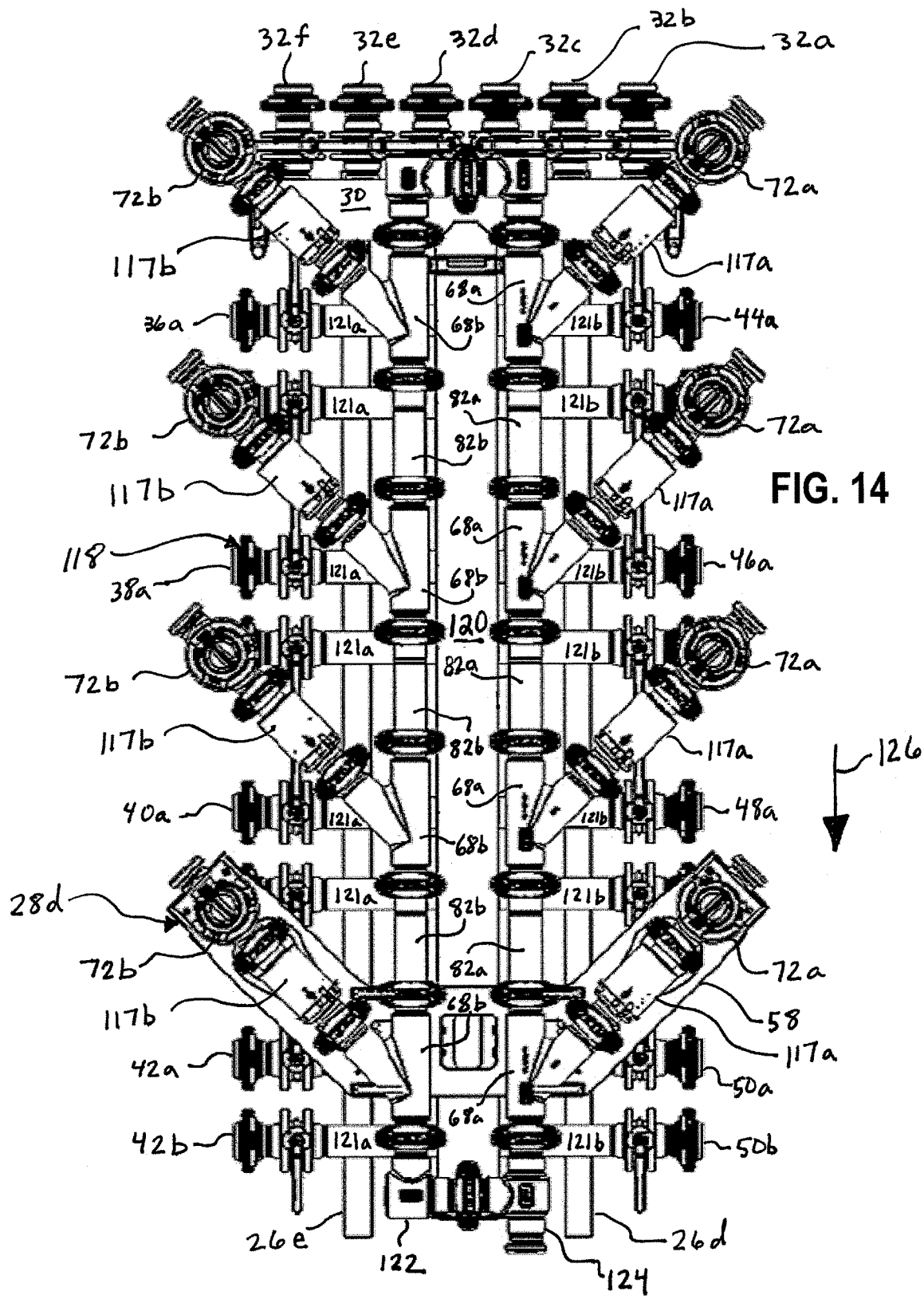
FIG. 14 is a top plan view of a manifold assembly, according to another exemplary embodiment.

In an exemplary embodiment, as illustrated in FIG. 14 with continuing reference to FIGS. 1-13, a manifold assembly is generally referred to by the reference numeral 116 and includes several components that are identical to corresponding components of the manifold assembly 12, which identical components are given the same reference numerals. The manifold assembly 116 includes the high pressure manifold 24 illustrated in FIGS. 2-4 and 6-9; however, for the purpose of clarity some of the components of the high pressure manifold 24 are not shown in FIG. 14 (e.g., not all of the upper wing mounting brackets 58 are shown in FIG. 14). The center tubular posts 60 are omitted from the high pressure manifold 24 when the high pressure manifold 24 is part of the manifold assembly 116. Correspondingly, the manifold assembly 116 includes the skid 26, but the vertically-extending center posts 26*l*-26*o* are omitted from the skid 26 when the skid 26 is part of the manifold assembly 116. Moreover, the skid 26 further includes longitudinally-extending structural members 26*d* and 26*e*. The respective isolation valves 72*a* are in fluid communication with the corresponding lateral y-fittings 68*a* via respective fittings 117*a*. The respective isolation valves 72*b* are in fluid communication with the corresponding lateral y-fittings 68*b* via respective fittings 117*b*.

As shown in FIG. 14, the manifold assembly 116 includes a low pressure manifold 118. The low pressure manifold 118 includes several components that are identical to corresponding components of the low pressure manifold 22, which identical components are given the same reference numerals. Instead of two flow lines, i.e., the flow lines 33*a* and 33*b*, the low pressure manifold 118 includes one flow line, namely flow line 120, which is connected to the rear header 30. The outlet ports 36*a*, 36*b*, 38*a*, 38*b*, 40*a*, 40*b*, 42*a* and 42*b* are connected to the flow line 120 via respective ones of a plurality of straight fittings 121*a*. The outlet ports 44*a*, 44*b*, 46*a*, 46*b*, 48*a*, 48*b*, 50*a* and 50*b* are connected to the flow line 120 via respective ones of a plurality of straight fittings 121*b*. The longitudinally-extending structural member 26*e* facilitates the support of the fittings 121*a*. Similarly, the longitudinally-extending structural member 26*d* facilitates the support of the fittings 121*b*. A right-angle fitting 122 is connected to the lateral y-fitting 68*b* of the high pressure module 28*d*. A t-fitting 124 is connected to each of the right-angle fitting 122 and the lateral y-fitting 68*a* of the high pressure module 28*d*.

In several exemplary embodiments, the operation of the manifold assembly 116 is similar to the operation of the manifold assembly 12, with the drilling fluid flowing towards the wellhead 18 in a direction indicated by arrow 126. The drilling fluid exits the high pressure manifold 24 via the t-fitting 124.

In several exemplary embodiments, the use of the skid 26 in each of the manifold assemblies 12, 94, 100, 106, 110 and 116 eliminates the need for a trailer during the operation thereof. As a result, more flexibility with respect to the overall height of each of the manifold assemblies 12, 94, 100, 106, 110 and 116 is provided.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "left" and right", "front" and "rear", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A module adapted to connect to a skid and form part of a manifold used to hydraulically fracture a subterranean formation within which a wellbore extends, the module comprising:
   a first mounting bracket;
   a first port connected to the first mounting bracket and adapted to be in fluid communication with a first pump, wherein the first pump is adapted to pressurize fluid to be conveyed to the wellbore to hydraulically fracture the subterranean formation within which the wellbore extends;
   a second port connected to the first mounting bracket and adapted to be in fluid communication with a second pump that is different from the first pump, wherein the second pump is adapted to pressurize fluid to be conveyed to the wellbore to hydraulically fracture the subterranean formation within which the wellbore extends; and
   a first fitting connected to the first mounting bracket and in fluid communication with at least one of the first and second ports;
   wherein the module provides a vertical offset between the first fitting and:
      the skid when the module is connected to the skid; and
      a horizontal surface upon which the module is adapted to rest when the module is disconnected from the skid;
   wherein the module is adapted to be connected to, and in fluid communication with, another module used to hydraulically fracture the subterranean formation within which the wellbore extends.

2. The module of claim 1, wherein the first fitting is adapted to receive pressurized fluid from at least one of the first and second pumps and convey the pressurized fluid to the wellbore.

3. The module of claim 1, further comprising a second fitting connected to the first mounting bracket and in fluid communication with the other of the first and second ports.

4. The module of claim 3, wherein the first fitting is in fluid communication with the first port and is adapted to be in fluid communication with the first pump;
   wherein the second fitting is in fluid communication with the second port and is adapted to be in fluid communication with the second pump; and
   wherein the first and second fittings are adapted to receive pressurized fluid from the first and second pumps, respectively, and convey the pressurized fluid to the wellbore.

5. The module of claim 1, further comprising a second mounting bracket connected to the first mounting bracket.

6. The module of claim 5, further comprising at least one post extending from the second mounting bracket and adapted to engage:
   the skid when the module is connected to the skid, the at least one post being disconnectable from, and reconnectable to, the skid; and the horizontal surface when the module is disconnected from the skid;
wherein the post provides the vertical offset between the first fitting and either the skid or the horizontal surface, the vertical offset facilitating serviceability of the fitting.

7. The module of claim 5, further comprising one or more vibration isolators connecting, and disposed between, the first and second mounting brackets.

8. The module of claim 1, wherein the first mounting bracket defines first and second sides spaced in a parallel relation;
wherein the first fitting and the first and second ports are mounted on the first side of the first mounting bracket; and
wherein the module further comprises:
at least one vibration isolator connected to the first mounting bracket on the second side thereof; and
a second mounting bracket connected to the at least one vibration isolator so that the vibration isolator is disposed between the first and second mounting brackets.

9. The module of claim 1, further comprising:
first and second isolation valves mounted on the first mounting bracket and in fluid communication with the first and second ports, respectively;
wherein the first fitting is in fluid communication with at least the first isolation valve.

10. The module of claim 9, further comprising a second fitting in fluid communication with the second isolation valve.

11. The module of claim 6, wherein the at least one post permits the vertical offset to be adjustable with respect to at least one of: the skid; and the horizontal surface.

12. The module of claim 6, wherein the module further comprises a carrier bracket adapted to support a swivel and connected to the at least one post.

13. The module of claim 7, wherein, when the module is connected to the skid, the second mounting bracket is disposed above the skid, the one or more vibration isolators are disposed above the second mounting bracket, the first mounting bracket is disposed above the one or more vibration isolators, and the first fitting is disposed above the first mounting bracket.

14. The module of claim 7, wherein at least one of the one or more vibration isolators comprises at least one of the following: a helical cable isolator; and a two-piece mount.

15. The module of claim 1, further comprising:
a second mounting bracket connected to the first mounting bracket;
at least one post extending from the second mounting bracket and adapted to engage:
the skid when the module is connected to the skid, the at least one post being disconnectable from, and reconnectable to, the skid; and
the horizontal surface when the module is disconnected from the skid;
wherein the post provides the vertical offset between the first fitting and either the skid or the horizontal surface, the vertical offset facilitating serviceability of the fitting;
wherein the first mounting bracket defines first and second sides spaced in a parallel relation;
wherein the first fitting and the first and second ports are mounted on the first side of the first mounting bracket;
wherein one or more vibration isolators are connected to the first mounting bracket on the second side thereof so that the one or more vibration isolators connect, and are disposed between, the first and second mounting brackets; and
wherein, when the module is connected to the skid:
the second mounting bracket is disposed above the skid,
the one or more vibration isolators are disposed above the second mounting bracket,
the first mounting bracket is disposed above the one or more vibration isolators, and
the first fitting is disposed above the first mounting bracket.

* * * * *